US012626410B2

(12) United States Patent
Wan et al.

(10) Patent No.: US 12,626,410 B2
(45) Date of Patent: May 12, 2026

(54) POINT CLOUD CODING METHOD, ENCODER AND DECODER

(71) Applicant: GUANGDONG OPPO MOBILE TELECOMMUNICATIONS CORP., LTD., Guangdong (CN)

(72) Inventors: Shuai Wan, Guangdong (CN); Zhecheng Wang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 371 days.

(21) Appl. No.: 18/329,927

(22) Filed: Jun. 6, 2023

(65) Prior Publication Data

US 2023/0316586 A1      Oct. 5, 2023

Related U.S. Application Data

(63) Continuation of application No. PCT/CN2020/136202, filed on Dec. 14, 2020.

(51) Int. Cl.
  *G06T 9/00*        (2006.01)
  *G06T 9/40*        (2006.01)
(52) U.S. Cl.
  CPC ............... *G06T 9/001* (2013.01); *G06T 9/40* (2013.01)
(58) Field of Classification Search
  None
  See application file for complete search history.

(56) References Cited

U.S. PATENT DOCUMENTS

| | | | | |
|---|---|---|---|---|
| 11,527,018 B2 * | 12/2022 | Mammou | ............... | G06T 9/004 |
| 11,922,665 B2 * | 3/2024 | Mammou | ............... | G06T 9/001 |
| 12,114,012 B2 * | 10/2024 | Zhu | ............... | H04N 21/234336 |
| 12,230,004 B2 * | 2/2025 | Zhang | ................... | H04N 19/597 |
| 2019/0394496 A1 * | 12/2019 | Tourapis | ................... | G06T 9/00 |
| 2023/0029767 A1 * | 2/2023 | Bannai | ............... | H01M 50/262 |
| 2023/0410377 A1 * | 12/2023 | Zhang | ................... | H04N 19/91 |

FOREIGN PATENT DOCUMENTS

| | | |
|---|---|---|
| CN | 103765887 | 4/2014 |
| CN | 111145090 | 5/2020 |
| CN | 111405281 | 7/2020 |
| CN | 111615792 | 9/2020 |
| CN | 111727460 | 9/2020 |

OTHER PUBLICATIONS

Blackberry, "[PCC] Neighbour-dependent entropy coding of occupancy patterns in TMC3," ISO/IEC JTC1/SC29/WG11 MPEG2018/m42238, Jan. 2018.
WIPO, International Search Report and Written Opinion for International Application No. PCT/CN2020/136202, Sep. 14, 2021.

* cited by examiner

*Primary Examiner* — Anand P Bhatnagar
(74) *Attorney, Agent, or Firm* — Hodgson Russ LLP

(57) ABSTRACT
A point cloud coding method is provided. The method includes the following. Occupancy bit information of neighbouring nodes of a current node is obtained. A context model is determined according to the occupancy bit information of the neighbouring nodes. Related information of the current node is entropy encoded with the context model and signalled into a bitstream, where the related information includes at least one of flag information of a single child node or coordinate information of the single child node.

20 Claims, 12 Drawing Sheets

OBTAIN OCCUPANCY BIT INFORMATION OF NEIGHBOURING NODES OF A CURRENT NODE — S401

DETERMINE A CONTEXT MODEL ACCORDING TO THE OCCUPANCY BIT INFORMATION OF THE NEIGHBOURING NODES — S402

ENTROPY ENCODE RELATED INFORMATION OF THE CURRENT NODE WITH THE CONTEXT MODEL AND SIGNAL INTO A BITSTREAM — S403

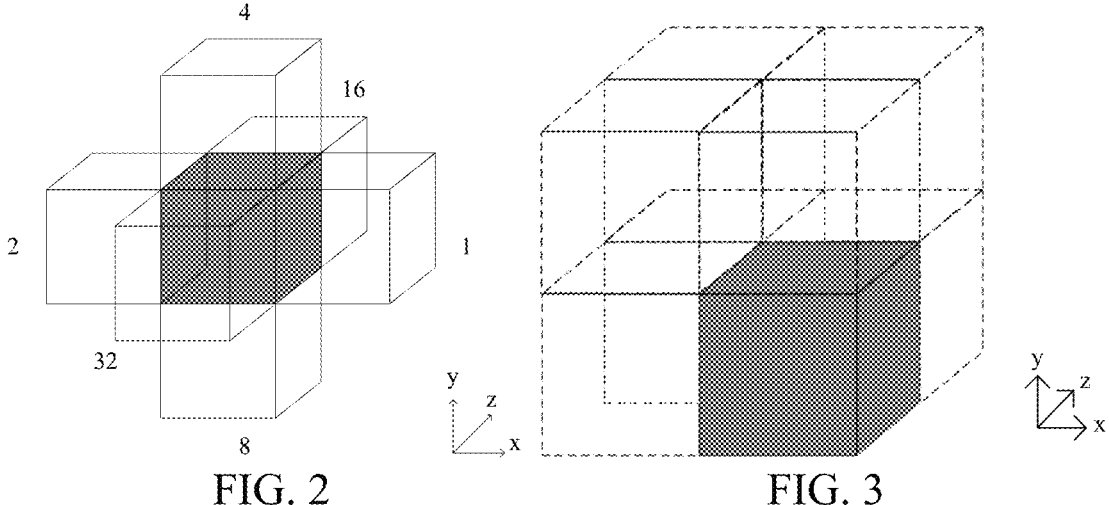
FIG. 2                    FIG. 3
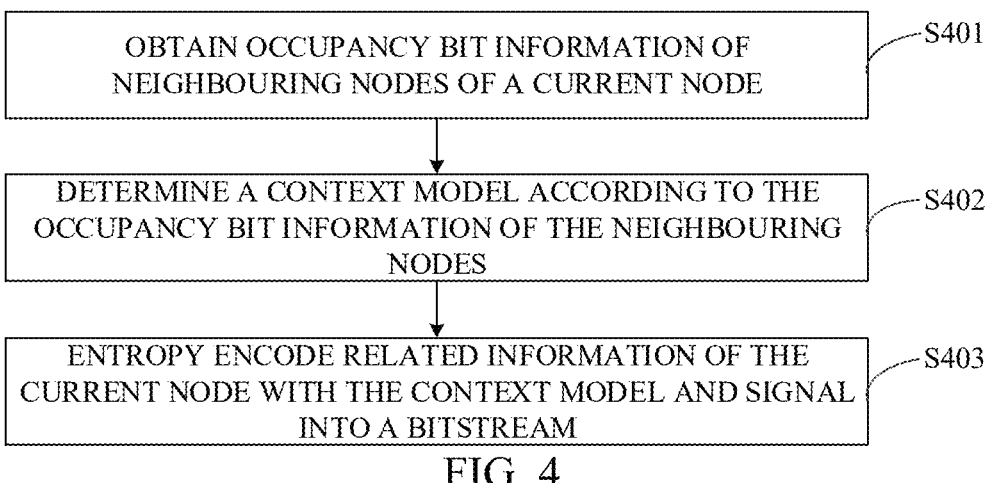
| OBTAIN OCCUPANCY BIT INFORMATION OF NEIGHBOURING NODES OF A CURRENT NODE | S401 |
| DETERMINE A CONTEXT MODEL ACCORDING TO THE OCCUPANCY BIT INFORMATION OF THE NEIGHBOURING NODES | S402 |
| ENTROPY ENCODE RELATED INFORMATION OF THE CURRENT NODE WITH THE CONTEXT MODEL AND SIGNAL INTO A BITSTREAM | S403 |
FIG. 4

POINT CLOUD CODING METHOD, ENCODER AND DECODER

CROSS-REFERENCE TO RELATED APPLICATION(S)

This application is a continuation of International Application No. PCT/CN2020/136202, filed Dec. 14, 2020, the entire disclosure of which is incorporated herein by reference.

TECHNICAL FIELD

The present disclosure relates to the field of coding technologies, in particular to a point cloud coding method, an encoder, and a decoder.

BACKGROUND

In a geometry-based point cloud compression (G-PCC) encoder framework, geometry information of a point cloud is encoded separately from attribute information corresponding to the point cloud. Once the geometry information has been encoded, the geometry information is reconstructed, based on which the attribute information is encoded. The encoding of the attribute information is focused on encoding of colour information in order to transform the colour information from the spatial domain to the frequency domain, so as to obtain high frequency coefficients and low frequency coefficients, and finally quantize and entropy encode the coefficients to generate a binary bitstream.

However, in current related techniques, spatial correlation is not fully utilized when constructing context models, which reduce the efficiency of point cloud encoding and decoding.

SUMMARY

In a first aspect, a point cloud encoding method is provided in implementations of the disclosure. The method is applied to an encoder and includes the following. Occupancy bit information of neighbouring nodes of a current node is obtained. A context model is determined according to the occupancy bit information of the neighbouring nodes. Related information of the current node is entropy encoded with the context model and signalled into a bitstream, where the related information includes at least one of flag information of a single child node or coordinate information of the single child node.

In a second aspect, a point cloud decoding method is provided in implementations of the disclosure. The method is applied to a decoder and includes the following. Occupancy bit information of neighbouring nodes of a current node is obtained. A context model is determined according to the occupancy bit information of the neighbouring nodes. Related information of the current node is obtained by parsing a bitstream with the context model, where the related information includes at least one of flag information of a single child node or coordinate information of the single child node.

In a third aspect, a decoder is provided in implementations of the disclosure. The decoder includes a memory and a processor, where the memory is configured to store a computer program that is able to run in the processor, and the processor is configured to perform the method of the second aspect when executing the computer program.

BRIEF DESCRIPTION OF THE DRAWINGS

FIG. 2 is a schematic structural diagram illustrating a neighbouring configuration number (NC) provided in a relevant technology.

FIG. 3 is a schematic structural diagram illustrating the number of occupied child nodes provided in a relevant technology.

FIG. 4 is a schematic flowchart of a point cloud encoding method provided in implementations of the present disclosure.

DETAILED DESCRIPTION

Figure 1A:
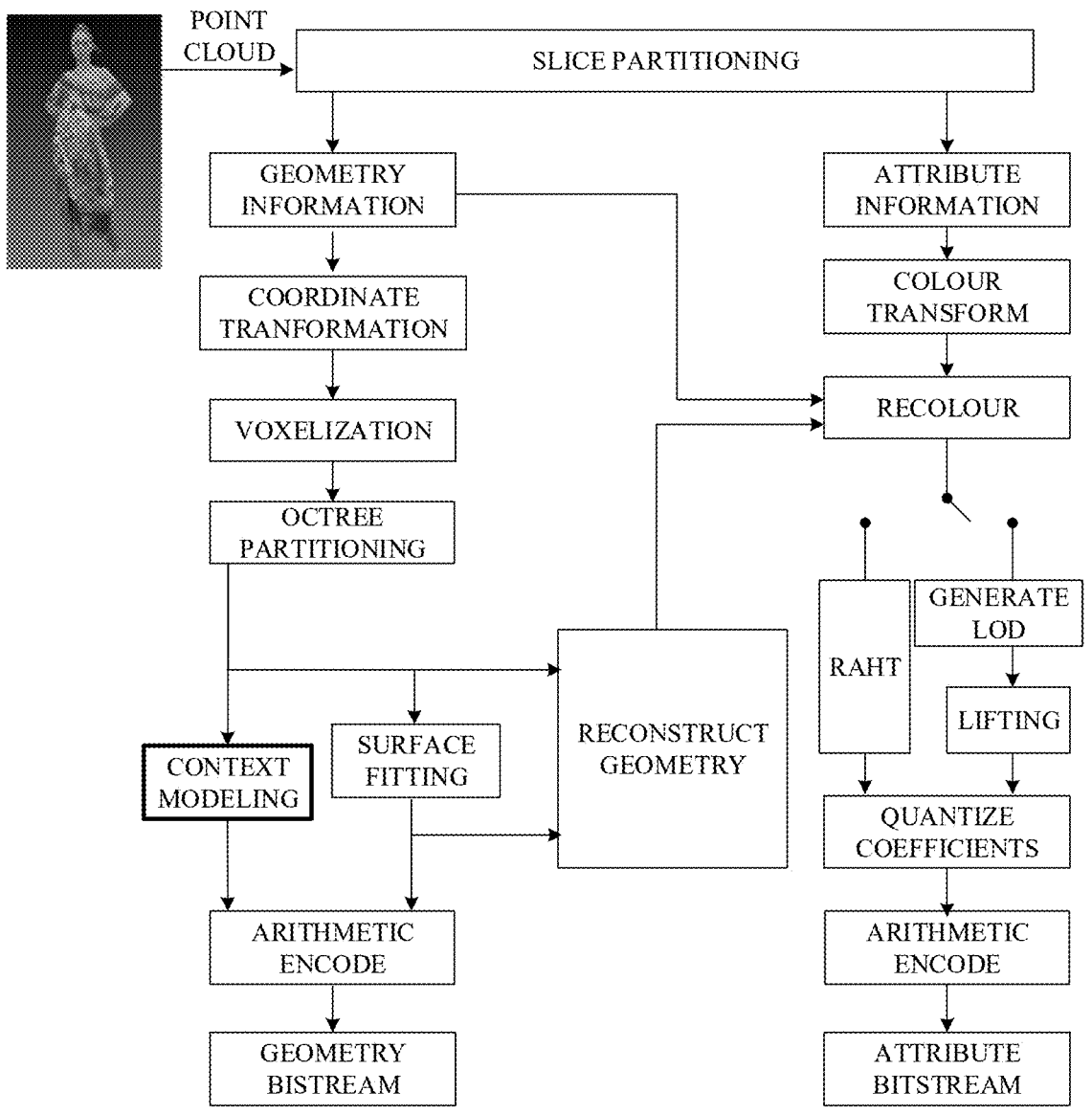
FIG. 1A is a schematic diagram of a framework of a G-PCC encoder provided in a relevant technology.

To enable a more detailed understanding of features and technical content in implementations of this disclosure, the implementations of this disclosure are described in detail below in conjunction with the accompanying drawings, which are provided for illustrative purposes only and are not intended to limit this disclosure.

Unless otherwise defined, all technical and scientific terms used herein have the same meaning as commonly understood by those skilled in the art. The terms used herein are for the purpose of describing implementations of the present disclosure only and are not intended to limit the present disclosure.

In the following description, reference to "some implementations" describes a subset of all possible implementations, but it will be understood that "some implementations" may refer to the same or different subsets of all possible implementations and may be combined with each other without conflict.

It should be noted that the terms "first/second/third" in implementations of the present disclosure are merely for distinguishing similar objects and do not imply a particular ordering with respect to the objects, and it is understood that "first/second/third" may, where appropriate, be interchanged in a particular order or sequence so that implementations of the present disclosure described herein can be implemented in an order other than that illustrated or described herein.

Before further detailed description of the present disclosures, the terms and terminology involved in the present disclosures are described, and the following explanation applies to the terms and terminology involved in the present disclosures.

1) point cloud compression (PCC)

2) geometry-based point cloud compression (G-PCC)

3) slice 4) bounding box 5) octree 6) intra prediction 7) triangle soup (trisoup)

8) context-based adaptive binary arithmetic coding (CABAC)

9) block 10) vertex 11) red-green-blue (RGB)

12) luminance-chrominance (YUV)

13) level of detail (LOD)

14) region adaptive hierarchal transform (RAHT)

15) look up table (LUT)

16) moving picture experts group (MPEG)

17) international standardization organization (ISO)

18) international electrotechnical commission (IEC)

19) number of occupied neighbours (No)

Here, a point cloud is a three-dimensional (3D) representation of the surface of an object. The point cloud (data) of the surface of the object can be captured by means of capture equipment such as photo radar, LIDAR, laser scanners, and multi-view cameras.

The point cloud is a large collection of 3D points. A point in the point cloud may include both position information and attribute information of the point. For example, the position information of the point may be 3D coordinate information of the point. The position information of the point may also be referred to as geometry information of the point. For example, the attribute information of the point may include colour information and/or reflectance, etc. For example, the colour information may be information on any colour space. For example, the colour information may be RGB information, where R represents red, G represents green and B represents blue. Another example of the colour information may be luminance-chrominance (YcbCr, YUV) information, where Y represents brightness (Luma), Cb (U) represents blue chrominance and Cr (V) represents red chrominance.

For a point cloud obtained based on laser measurement, a point in the point cloud may include 3D coordinate information of the point and laser reflectance of the point. For a point cloud obtained based on photogrammetry, a point in the point cloud may include 3D coordinate information of the point and colour information of the point. For a point cloud obtained based on laser measurement and photogrammetry, a point in the point cloud may include the 3D coordinate information of the point, the laser reflectance of the point, and the colour information of the point.

Point clouds may be classified according to the obtaining manners as:

a first type: static point cloud, that is, the object is stationary and the point cloud obtaining device is also stationary;

a second type: dynamic point cloud, that is, the object is in motion, but the point cloud obtaining device is stationary; and a third type: dynamically-obtained point cloud, that is, the point cloud obtaining device is in motion.

For example, point clouds may be classified into two main categories according to usage as:

category 1: machine perception point cloud, which may be used in scenarios such as autonomous navigation systems, real-time inspection systems, geographic information systems, visual sorting robots, and rescue and disaster relief robots; and category 2: human eye perception point cloud, which may be used in scenarios such as digital cultural heritage, free point-of-view broadcasting, 3D immersive communication, and 3D immersive interaction.

As the point cloud is a collection of massive amounts of points, storing the point cloud not only consumes a lot of memory, but is also not conducive to transmission. Also, there is no such large bandwidth available to support the transmission of the point cloud directly across the network layer without compression.

As of today, point cloud coding frameworks that can compress the point cloud are either the geometry point cloud compression (G-PCC) codec framework or the video point cloud compression (V-PCC) codec framework provided by the moving picture experts group (MPEG), or the AVS-PCC codec framework provided by the audio video standard (AVS). The G-PCC codec framework may be used for compression of the first type of static point cloud and the third type of dynamically-obtained point cloud, and the V-PCC codec framework may be used for compression of the second type of dynamic point cloud. The G-PCC codec framework is also known as the point cloud codec TMC13 and the V-PCC codec framework is also known as the point cloud codec TMC2.

It can be understood that in the G-PCC encoder framework, an input point cloud is partitioned into slices and then the slices are encoded independently.

In the G-PCC encoder framework illustrated in FIG. 1A, the input point cloud is partitioned into slices and then each slice is encoded independently. In a slice, the geometry information of the point cloud and the attribute information corresponding to the points in the point cloud are encoded separately. The G-PCC encoder first encodes the geometry information. The encoder performs coordinate conversion on the geometry information such that the whole point cloud is contained in a bounding box. This is followed by quantization, which is mainly a scaling process. Due to rounding in the quantization, some of the points have the same geometry information. Duplicate points are removed depending on parameters. The process of quantization and removing duplicate points is also known as voxelization. Next, octree partitioning is performed on the bounding box. Depending on the depth of the octree partitioning, encoding of the geometry information may be based on two frameworks, namely an octree-based framework and a triangle soup (trisoup)-based framework.

In the octree-based framework for geometry information encoding, the bounding box is octeted into 8 sub-cubes and occupancy bits of the sub-cubes are recorded (where 1 represents non-empty and 0 represents empty). The non-empty sub-cubes are continued to be octeted, generally until a resulting leaf node is a 1×1×1 unit cube. In this process, spatial correlation between a node and the surrounding nodes is used for intra prediction of the occupancy bits, and finally arithmetic encoding (CABAC) is performed to generate a binary geometry bitstream, i.e., the geometry bitstream.

In the trisoup-based framework for geometry information encoding, the octree partitioning is also performed first. However, different from the octree-based geometry encoding, instead of partitioning the point cloud layer-by-layer into 1×1×1 unit cubes, the partitioning is stopped when the side length of the block is W. Based on a surface formed by distribution of the point cloud in each block, up to 12 vertexes generated between the 12 edges of the block and the surface are obtained. Finally, coordinates of the vertexes of each block are encoded in sequence to generate the binary geometry bitstream, i.e. the geometry bitstream.

After finishing encoding of the geometry information, the G-PCC encoder reconstructs the geometry information and uses the reconstructed geometry information to encode the attribute information of the point cloud. Currently, attribute encoding of the point cloud is focused on encoding of the colour information of the points in the point cloud. First, the encoder may perform colour space conversion on the point colour information. For example, when the colour information of the points in the input point cloud is represented using the RGB colour space, the encoder may convert the colour information from the RGB colour space to the YUV colour space. The reconstructed geometry information is then used to recolour the point cloud, so as to make the uncoded attribute information correspond to the reconstructed geometry information. There are two main transformation methods for encoding of the colour information, that is, a distance-based lifting transform that relies on LOD partitioning and a direct RAHT transform, both of which transform the colour information from the spatial domain to the frequency domain to obtain high frequency coefficients and low frequency coefficients, and finally quantize and arithmetically encode the coefficients to generate a binary attribute bitstream, that is, the attribute bitstream.

Based on the G-PCC encoder framework illustrated in FIG. 1A, entropy encoding may be performed based on the geometry information of neighbouring nodes in the point cloud. Here, a context model is constructed based on occupancy bits of 6 neighbouring nodes of a current node for CABAC.

In one specific example, the specific implementation on the G-PCC encoder side is described as follows.

(1) Obtain occupancy bits of the 6 neighbouring nodes of the current node. The occupancy bit indicates whether there is a point(s) occupying the neighboring node. If the neighboring node is occupied by a point, the occupancy bit is 1; otherwise, the occupancy bit is 0. A neighbouring configuration number (NC) may be calculated from the occupancy bits of the neighbouring nodes. The NC may take values from 0 to 63, i.e., 000000 to 111111 in binary. As illustrated in FIG. 2, FIG. 2 is a schematic structural diagram illustrating the neighbouring configuration number provided in the related art. In FIG. 2, a node filled with black represents the current node which has 6 neighbouring nodes. The NC is 1 if the neighbour node on the right side is occupied by a point. The NC is 2 if the neighbouring node on the left side is occupied by a point. The NC is 4 if the neighbouring node on the upper side is occupied by a point. The NC is 8 if the neighbouring node on the lower side is occupied by a point. The NC is 16 if the neighbouring node on the rear side is occupied by a point. The NC is 32 if the neighbouring node on the front side is occupied by a point.

(2) Obtain occupancy bits of 8 child nodes of the current node. If there is a point(s) occupying the child node, then the occupancy bit is 1; otherwise, if there is no point occupying the child node, then the occupancy bit is 0. The number of occupied child nodes ($N_{oc}$) is calculated from the occupancy bits of the child nodes. $N_{oc}$ may take values from 1 to 8. As illustrated in FIG. 3, FIG. 3 is a schematic structural diagram illustrating the number of occupied child nodes provided in the related art. The current node may be partitioned into 8 child nodes. In FIG. 3, $N_{oc}$=1, i.e., among the 8 child nodes of the current node, only one child node (filled with black, which is referred to as a single child node) is occupied by a point.

(3) When NC==0 (the neighbouring configuration number is 0, i.e., none of the 6 neighbouring nodes is occupied), then if a flag is assigned to 1, it indicates that $N_{oc}$ is equal to 1 (i.e. only one of the 8 child nodes is occupied), and if the flag is assigned to 0, it indicates that $N_{oc}$ is not equal to 1 (i.e., more than one of the 8 child nodes is occupied), and the flag is encoded using adaptive binary arithmetic encoding and signalled into the bitstream.

(4) When NC==0 and flag-1 (none of the 6 neighbouring nodes is occupied and only one of the 8 child nodes is occupied), the coordinate information of the only one occupied child node in the current node is calculated based on the occupancy bits of the 8 child nodes of the current node (i.e., XYZ coordinate values, which may be 0 or 1 respectively, taking FIG. 3 as an example, XYZ coordinate values are (1, 0, 0)), and the XYZ coordinate values are encoded using equal probability static binary arithmetic encoding, respectively.

(5) When NC==0 and flag==0 (none of the 6 neighbouring nodes is occupied and more than one of the 8 child nodes are occupied) or when NC>0 (there is an occupied neighbouring node among the 6 neighbouring nodes), the occupancy bits of the 8 child nodes of the current node are encoded using CABAC and signalled into the bitstream.

Figure 1B:
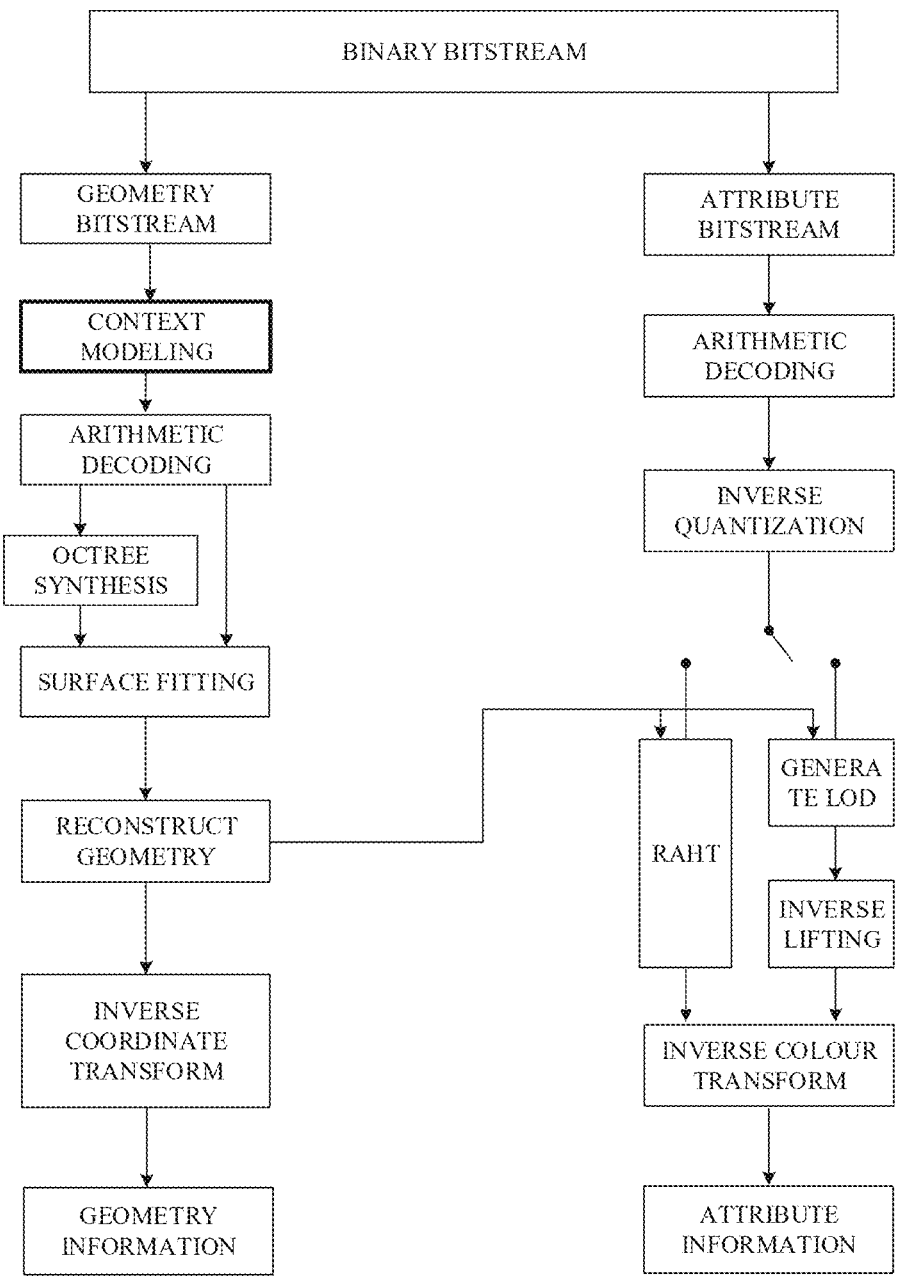
FIG. 1B is a schematic diagram of a framework of a G-PCC decoder provided in a relevant technology.

In the G-PCC decoder framework illustrated in FIG. 1B, after obtaining the binary bitstream, the geometry bitstream and the attribute bitstream in the binary bitstream are decoded independently. During decoding of the geometry bitstream, the geometry information of the point cloud is obtained through arithmetic decoding-octree synthesis-surface fitting-geometry reconstruction-inverse coordinate transformation. During decoding of the attribute bitstream, the attribute information of the point cloud is obtained through arithmetic decoding-inverse quantization-LOD-based inverse lifting or RAHT-based inverse transformation-inverse colour transformation. The 3D model of the point cloud data to-be-encoded is restored based on the geometry information and attribute information.

Based on the G-PCC decoder framework illustrated in FIG. 1B, entropy decoding may also be performed based on the geometry information of neighbouring nodes in the point cloud. Here, the context model is still constructed based on the occupancy bits of the 6 neighbouring nodes of the current node for CABAC decoding.

In one specific example, the specific implementation on the G-PCC decoder side is described as follows.

(1) Obtain the occupancy bits of the 6 neighbouring nodes of the current node, i.e. if there is a point(s) occupying the neighbouring node, the occupancy bit is 1; otherwise the occupancy bit is 0, from which the NC is calculated.

(2) When NC==0 (the neighbour configuration number is 0, i.e. no neighbouring node is occupied among the 6 neighbouring nodes), the flag is obtained using adaptive binary arithmetic decoding.

(3) When NC==0 and flag==1 (no neighbouring node is occupied among the 6 neighbour nodes and only 1 child node is occupied among the 8 child nodes), the XYZ coordinate values of the only occupied child node in the current node is obtained using equal probability static binary arithmetic decoding, and the occupancy bits of the 8 child nodes are restored.

(4) When NC==0 and flag-0 (no neighbouring node is occupied among the 6 neighbours and more than 1 child node is occupied among the 8 child nodes) or when NC>0 (a neighbouring node is occupied among the 6 neighbours), the occupancy bits of the 8 child nodes of the current node are obtained by decoding using CABAC.

As an example of geometry syntax for octree nodes, Table 1 gives an example of syntax elements and semantic description provided in the related art as follows.

TABLE 1

| | Descriptor |
|---|---|
| geometry_node( depth, nodeIdx, sN, tN, vN ) { | |
|   if( depth = = GeomScalingDepth ) { | |
|     geom_node_qp_offset_eq0_flag | ae(v) |
|     if( ! geom_node_qp_offset_eq0_flag) { | |
|       geom_node_qp_offset_sign_flag | ae(v) |
|       geom_node_qp_offset_abs_minus1 | ae(v) |
|     } | |
|   } | |
|   if( geometry_planar_enabled_flag ) | |
|     for( axisIdx = 0; axisIdx < 3; axisIdx++ ) | |
|       if( PlanarEligible[ axisIdx ] ) { | |
|         is_planar_flag[ axisIdx ] | ae(v) |
|         if( is_planar_flag[ axisIdx ] ) | |
|           plane_position[ axisIdx ] | ae(v) |
|       } | |
|   if( DirectModeFlagPresent ) | |
|     direct_mode_flag | ae(v) |
|   if( direct_mode_flag ) | |
|     geometry_direct_mode_data( ) | |
|   else { | |
|     if( OccupancyIdxMaybePresent ) | |
|       single_child_flag | ae(v) |
|     if( single_child_flag ) | |
|       for( k = 0; k < 3; k++ ) | |
|         if( ! isPlanar[ k ] ) | |
|           occupancy_idx[ k ] | ae(v) |
|     if( OccupancyMapPresent ) | |
|       if( bitwise_occupancy_flag ) | |
|         occupancy_map | ae(v) |
|       else | |
|         occupancy_byte | de(v) |
|     if( LeafNode && !unique_geometry_points_flag ) | |
|       for( child = 0; child < NumChildren; child++ ) { | |
|         num_points_eq1_flag[ child ] | ae(v) |
|         if( !num_points_eq1_flag[ child ] ) | |
|           num_points_minus2[ child ] | ae(v) |
|       } | |
|   } | |
| } | |

In the G-PCC draft international standards (DIS), the syntax is described as "The variable OccupancyIdxMaybePresent specifies when single_occupancy_flag is present in the octree node syntax".

In implementations of the present disclosure, the flag information OccupancyIdxMaybePresent indicates whether a bit field corresponding to the syntax element single_child_flag is present in the bitstream. In a specific implementation, the flag information OccupancyIdxMaybePresent indicates whether the bit field corresponding to the syntax element single_child_flag is present in a data unit corresponding to the octree node in the bitstream. When the value of the flag information OccupancyIdxMaybePresent is equal to 1, the bit field corresponding to the syntax element single_child_flag is present in the bitstream. Here, one way of determining the value of the flag information OccupancyIdxMaybePresent is given in the following pseudo-code:

numPlanarAxes=IsPlanar[0]+IsPlanar[1]+IsPlanar[2];
numNonPlanarAxes=IsNotPlanar[0]+IsNotPlanar[1]+Is-NotPlanar[2];
OccupancyIdxMaybePresent=numPlanarAxes<3||
(!NeighPattern && !numNonPlanarAxes).

In the above, for IsPlanar[k], k takes the values of 0, 1, and 2, which represent the x, y and z coordinate axis directions respectively. Specifically, IsPlanar[k] being 1 indicates that a planar encoding mode is used in a case where a condition for the planar encoding mode is met and positions of child nodes partitioned from the current node form a plane perpendicular to the coordinate axis. IsPlanar[k] being 0 indicates other cases, including a case where the condition for the planar encoding mode is met and the positions of child nodes partitioned from the current node occupy two planes perpendicular to the coordinate axis, and a case where the condition for the planar encoding mode is not met. Here, numPlanarAxes represents the number of coordinate axis directions in which the planar encoding mode is used when the condition for the planar encoding mode is met.

For IsNotPlanar[k], k takes the values 0, 1 and 2, which represent the x, y and z coordinate axis directions respectively. Specifically, IsNotPlanar[k] being 1 indicates that the planar encoding mode is not used in a case where the condition for the plane encoding mode is met and the positions of child nodes partitioned from the current node occupy two planes perpendicular to the coordinate axis. IsNotPlanar[k] being 0 indicates other cases, including: a case where the condition for the planar encoding mode is met and positions of child nodes partitioned from the current node form a plane perpendicular to the coordinate axis, and a case where the condition for the plane encoding mode is not met. Here, numNonPlanarAxes represents the number of coordinate axis directions in which the planar encoding mode is not used when the condition for the planar encoding mode is not met.

In addition, numPlanarAxes<3 indicates that the planar coding mode is not used for all x, y and z coordinate axis directions when the condition for the planar encoding mode is met. (!NeighPattern && !numNonPlanarAxes) indicates that the NC is 0 (i.e., no neighbouring node among the 6 neighbouring nodes is occupied) and the condition for the planar encoding mode is met in the x, y and z coordinate axis directions, and the positions of the child nodes partitioned from the current node forms a plane perpendicular to the coordinate axis, or indicates that the condition for the planar encoding mode is not met. Here, OR operation is performed on "numPlanarAxes<3" and "(!NeighMode && !numNonPlanarAxes)" to determine the value of the flag information OccupancyIdxMaybePresent.

Exemplarily, the encoder determines the value of the flag information OccupancyIdxMaybePresent in the above manner. When the encoder determines that the value of OccupancyIdxMaybePresent is equal to 1, the encoder signals the value of single_child_flag to the data unit in the bitstream using the entropy encoding method corresponding to ae(v); when the encoder determines that the value of OccupancyIdxMaybePresent is equal to 0, the encoder does not signal the value of single_child_flag to the data unit in the bitstream. ae(v) indicates that the syntax unit is encoded using a context adaptive arithmetic entropy encoding method, where the data unit may be a data unit corresponding to the octree node, e.g., the geometry information data unit of the octree node. The encoder encodes the point cloud bitstream according to the single_child_flag, e.g. encoding the geometry information of the octree node and encoding the attribute information of the point cloud data.

Exemplarily, the decoder uses the method described above to determine the value of the flag information OccupancyIdxMaybePresent. When the decoder determines that the value of OccupancyIdxMaybePresent is equal to 1, the decoder determines the value of single_child_flag by parsing the bit field corresponding to single_child_flag from the data unit of the bitstream using the entropy decoding method corresponding to ae(v). When the decoder determines that the value of OccupancyIdxMaybePresent is equal to 0, the decoder determines that the bit field corresponding to single_child_flag is absent in the data unit of the bitstream; in this case, the decoder does not need to parse the bitstream to obtain the value of single_child_flag, and optionally, the decoder sets the value of single_child_flag to the default value 0. Here, ae(v) indicates that the bit field corresponding to the syntax unit in the bitstream is parsed using a context-adaptive arithmetic entropy decoding method. The data unit may be the data unit corresponding to an octree node, e.g., the geometry information data unit of the octree node. The decoder decodes the point cloud bitstream according to the single_child_flag, e.g. decodes the geometry information of the octree node and decodes the attribute information of the point cloud data.

In addition, for the syntax element single_child_flag, when the value of single_child_flag is equal to 1, it indicates that the current node has only one occupied child node, and when the value of single_child_flag is equal to 0, it indicates that the current node has more than one occupied child nodes. Alternatively, if the current node has no occupied child node, the value of single_child_flag will be inferred to be 0. That is, the flag of 1 means that $N_{oc}$ is equal to 1 (i.e. only 1 child node among the 8 child nodes is occupied) and the flag of 0 means that $N_{oc}$ not equal to 1 (i.e. more than 1 child node out among the 8 child nodes are occupied).

For the syntax element occupancy_idx[i], occupancy_idx [i] represents the i-th bit of the index of the single child node of the current node in the octree child node traversal order, where the 0th bit represents the z-directional coordinate (0 or 1) of the single child node in the current node, the $1^{st}$ bit represents the y-directional coordinate (0 or 1) of the single child node in the current node, and the $2^{nd}$ bit represents the x-directional coordinate (0 or 1) of the single child node in the current node.

However, in relevant techniques, there is a method in which when NC==0 and $N_{oc}$ 1 (no neighbouring node is occupied among the 6 neighbouring nodes and only 1 child node is occupied among the 8 child nodes), then the XYZ coordinate values of the only occupied child node of the current node (which may be referred to as "single child node") within the current node will be coded (the XYZ coordinate values within the current node may take the values of 0 or 1; taking FIG. 3 as an example, the XYZ coordinate values are (1, 0, 0)). This method may be referred to as "single child node coordinate coding method". Since this method does not make full use of spatial correlation, the coding efficiency is reduced.

Implementations of the present disclosure provide a point cloud encoding method, the basic idea of which is to obtain occupancy bit information of neighbouring nodes of the current node, determine a context model according to the occupancy bit information of the neighbouring nodes, and entropy encode the related information of the current node with the context model and signal it into a bitstream, where the related information includes at least one of flag information of a single child node and coordinate information of the single child node. In this way, the spatial correlation of the point cloud may be fully utilized by using the occupancy bit information of the neighbouring nodes to construct the context model, so that the flag information and the coordinate information of the single child node are entropy encoded based on the constructed context model, and thus the coding efficiency of the point cloud can be improved.

Implementations of this disclosure will be described in detail below in conjunction with the accompanying drawings.

In the implementations of the present disclosure, the point cloud encoding method provided in this disclosure is applied to a video encoding device, i.e., a G-PCC encoder, which may also be referred to as an encoder for short. The functions implemented by the method may be achieved by a first processor in the encoder calling a computer program, which may be stored in a first memory. As can be seen, the encoder includes at least the first processor and the first memory.

Referring to FIG. 4, FIG. 4 illustrates a schematic flowchart of a point cloud encoding method provided in implementations of the present disclosure. As illustrated in FIG. 4, the method may include the following.

At S401, occupancy bit information of neighbouring nodes of a current node is obtained.

It should be noted that in a point cloud, a point(s) may be all points or some points in the point cloud that are relatively concentrated in space. Here, the current node may also be referred to as a current point or a current block, specifically the point or block that is currently to be encoded in the point cloud.

It should also be noted that, based on the framework of the G-PCC encoder illustrated in FIG. 1A, the method in this disclosure is mainly applied to the "context modelling" part, which optimizes the geometry information entropy encoding that is based on the point cloud neighbouring nodes in the related art, in order to improve the exploitation of spatial correlation.

It is understood that the occupancy bit information of a neighbouring node is determined based on whether there is a point(s) occupying that neighbouring node. In some implementations, the occupancy bit information of the neighbouring nodes of the current node may be obtained as follows.

If the neighbouring node is occupied by a point(s), it is determined that the occupancy bit information of the neighbouring node is equal to a first value.

If the neighbouring node is not occupied by any point, it is determined that the occupancy bit information of the neighbouring node is equal to a second value.

In this disclosure, the neighbouring nodes include at least one of: a neighbouring node coplanar with the current node, a neighbouring node collinear with the current node, or a neighbouring node concurrent with the current node.

That is, at least one point may be obtained by partitioning the point cloud spatially. From the at least one point, the neighbouring nodes of the current node are determined according to a geometry position of the current node. Typically, the number of neighbouring nodes of the current node is 26 in total. The number of neighbouring nodes coplanar with the current node is 6, the number of neighbouring nodes collinear with the current node is 12, and the number of neighbouring nodes concurrent with the current node is 8.

In this disclosure, the first value may be 1 and the second value may be 0; or, the first value may be 0 and the second value may be 1. In one specific example, the first value may be set to 1 and the second value may be set to 0, but without specific limitation.

For example, the first value is 1 and the second value is 0. If a neighbouring node is occupied by a point, then the occupancy bit information of that neighbouring node is equal to 1. If a neighbouring node is not occupied by any point, then the occupancy bit information of that neighbouring node is equal to 0. Conversely, if the occupancy bit information of a neighbouring node is equal to 1, it indicates that a point(s) occupies the neighbouring node. If the occupancy bit information of a neighbouring node is equal to 0, it indicates that no point occupies the neighbouring node.

At S402, a context model is determined according to the occupancy bit information of the neighbouring nodes.

At S403, related information of the current node is entropy encoded with the context model and signalled into a bitstream.

In implementations of the present disclosure, the related information may include at least one of flag information of a single child node or coordinate information of the single child node. Accordingly, the context model may include a first context model and a second context model. The first context model is used for predicting the flag information of the single child node and the second context model is used for predicting the coordinate information of the single child node.

In one possible implementation, when the related information is the flag information of the single child node, in some implementations, the operations at S402 of determining the context model according to the occupancy bit information of the neighbouring nodes may include the following.

Prediction flag information of the current node is determined according to the occupancy bit information of the neighbouring nodes. The first context model is determined according to the prediction flag information of the current node.

It is noted that, according to the prediction flag information of the current node, an index value of the first context model may be determined, and then according to the index value of the first context model, the first context model may be determined. Accordingly, in some implementations, the first context model may be determined according to the prediction flag information of the current node as follows.

The index value of the first context model is obtained according to the prediction flag information of the current node. The first context model is determined according to the index value of the first context model.

In a specific implementation, the method may further include constructing at least one first candidate context model, where different first candidate context models correspond to different index values.

Accordingly, the first context model may be determined according to the index value of the first context model as follows.

A first candidate context model corresponding to the index value is selected from the at least one first candidate context model according to the index value of the first context model, and the selected first candidate context model is determined as the first context model.

In other words, at least one first candidate context model may be constructed in advance, and different first candidate context models output different flag information, and different first candidate context models correspond to different index values. In this way, different index values may be determined based on the different flag information. Thus, after the index value of the first context model is determined based on the prediction flag information of the current node, the first candidate context model corresponding to the index value may then be selected from the at least one first candidate context model and determined as the first context model.

Further, for S403, in some implementations, the related information of the current node may be entropy encoded using the context model and signalled into the bitstream as follows.

The number of occupied child nodes of the current node is determined. The flag information of the single child node is determined according to the number of occupied child nodes. The flag information of the single child node is entropy encoded with the first context model and signalled into the bitstream.

It is noted that the number of occupied child nodes ($N_{oc}$) is used to indicate whether there is a child node is occupied among multiple child nodes of the current node. Here, in some implementations, the number of occupied child nodes of the current node may be determined as follows.

Occupancy bit information of the child nodes partitioned from the current node is determined. The number of the occupied child nodes is determined according to the occupancy bit information of the child nodes.

Here, the child nodes partitioned from the current node usually include 8 child nodes, i.e., the current node may be partitioned into 8 child nodes as illustrated in FIG. 3.

It is further noted that occupancy bit information of a child node is determined based on whether there is a point occupying the child node. In a specific implementation, the occupancy bit information of the child nodes partitioned from the current node may be obtained as follows.

If a child node is occupied by a point, it is determined that the occupancy bit information of the child node is equal to the first value. If the child node is not occupied by any point, it is determined that the occupancy bit information of the child node is equal to the second value.

In this disclosure, the first value may be 1 and the second value may be 0; or, the first value may be 0 and the second value may be 1. In one specific example, the first value may be set to 1 and the second value may be set to 0, but without specific limitation.

For example, the first value is 1 and the second value is 0. If a child node is occupied by a point, then the occupancy bit information of that child node is equal to 1. If a child node is not occupied by any point, then the occupancy bit information of that child node is equal to 0. In this way, the number of occupied child nodes may be calculated based on occupancy bit information of the 8 child nodes. For example, if only one of the 8 child nodes is occupied, then the number of occupied children is equal to 1. Conversely, if more than one of the 8 child nodes are occupied, then the number of occupied children is not equal to 1.

In other words, the number of occupied child nodes may reflect whether the current node have any occupied child node. In some implementations, the method may further include the following.

If the number of occupied child nodes is equal to 1, it is determined that the child nodes partitioned from the current node include only one occupied child node. If the number of occupied child nodes is not equal to 1, it is determined that the child nodes partitioned from the current node include at least two occupied child nodes.

In this disclosure, the number of occupied child nodes ranges from 1 to 8. That is to say, if the number of occupied child nodes is equal to 1, it may indicate that only one child node of the current node is occupied, i.e., the child nodes partitioned from the current node include only one occupied child node. In this case, the occupied child node is the single child node described in this disclosure. If the number of occupied child nodes is not equal to 1, it may indicate that more than one child nodes of the current node are occupied, i.e., the child nodes partitioned from the current node include at least two occupied child nodes.

Further, in some implementations, the flag information (e.g., flag) of the single child node is determined mainly according to the number of occupied child nodes. Thus, in one specific implementation, the flag information of the single child node may be determined according to the number of occupied child nodes as follows.

If the number of occupied child nodes is equal to 1, a value of the flag information of the single child node is determined as a first flag value. If the number of occupied child nodes is not equal to 1, the value of the flag information of the single child node is determined as a second flag value.

In another specific implementation, the flag information of the single child node may be determined according to the number of occupied child nodes as follows.

If only one of the child nodes partitioned from the current node is occupied, the value of the flag information of the single child node is determined the first flag value. If at least two of the child nodes partitioned from the current node are occupied, the flag information of the single child node is determined as the second flag value.

In this disclosure, the first flag value may be 1 and the second flag value may be 0; or, the first flag value may be 0 and the second flag value may be 1. In one specific example, the first flag value may be set to 1 and the second flag value may be set to 0, but without specific limitation.

It should be noted that the value of the flag information may also be the number of occupied child nodes. For example, if the current node has no occupied child node, then the value of the flag information is equal to 0. If the current node has only one occupied child, then the value of the flag information is equal to 1. If the current node has at least two occupied child nodes, then the value of the flag information is greater than or equal to 2.

In this way, after the value of the flag information has been determined, the value of the flag information may be entropy encoded with the first context model and signalled into the bitstream.

In another possible implementation, when the related information is the coordinate information of the single child node, for S402, in some implementations, the context model may be determined according to the occupancy bit information of the neighbouring nodes as follows.

Prediction coordinate information of the current node is determined according to the occupancy bit information of the neighbouring nodes. The second context model is determined according to the prediction coordinate information of the current node.

It is noted that, according to the prediction coordinate information of the current node, an index value of the second context model may be determined, and then according to the index value of the second context model, the second context model may then be determined. Thus, in some implementations, the second context model may be determined according to the prediction coordinate information of the current node as follows.

The index value of the second context model is determined according to the prediction coordinate information of the current node. The second context model is determined according to the index value of the second context model.

In a specific implementation, the method may further include constructing at least one second candidate context model, where different second candidate context models correspond to different index values.

Accordingly, the second context model may be determined according to the index value of the second context model as follows.

According to the index value of the second context model, a second candidate context model corresponding to the index value is selected from the at least one second candidate context model, and the selected second candidate context model is determined as the second context model.

That is, in the present disclosure, at least one second candidate context model may be constructed in advance. Different second candidate context models output different coordinate information, while different second candidate context models correspond to different index values. In this way, different index values may be determined according to different flag information. In this way, after the index value of the second context model is determined according to the prediction coordinate information of the current node, the second candidate context model corresponding to the index value may then be selected from the at least one second candidate context model and determined as the second context model.

Further, for S403, in some implementations, the related information of the current node may be entropy encoded with the context model and signalled into the bitstream as follows.

When the flag information of the single child node indicates that only one of the child nodes partitioned from the current node is occupied, the coordinate information of the single child node is determined, and the coordinate information of the single child node is entropy encoded with the second context model and signalled into the bitstream.

It should be noted that when the value of the flag information indicates that only one of the child nodes partitioned from the current node is occupied, it is necessary to determine the coordinate information of the only occupied child node (which may be referred to as the "single child node"), so as to entropy encode the coordinate information of the single child node and signal into the bitstream.

In implementations of the present disclosure, the entropy encoding method used for the coordinate information of the single child node may differ due to the neighbouring configuration number (NC). Therefore, in some implementations, the method may further include determining the NC of the current node.

In this way, according to the NC of the current node, whether the current node has an occupied neighbouring node can be determined, and then it is possible to further determine the entropy encoding method to be used for the coordinate information of the single child node, such as an entropy encoding method for the coordinate information of the single child node using the second context model, or an equal probability static binary arithmetic encoding method for the coordinate information of the single child node.

In some implementations, for S403, the related information of the current node may be entropy encoded with the context model and signalled into the bitstream as follows.

When the NC indicates that a neighbouring node of the current node is occupied, then when the flag information of the single child node indicates that only one of the child nodes partitioned from the current block is occupied, the coordinate information of the single child node is determined and entropy encoded with the second context model, and then signalled into the bitstream.

Further, in some implementations, the method may further include the following.

When the NC indicates that a neighbouring node of the current node is occupied, then when the flag information of the single child node indicates that only one of child nodes partitioned from the current block is occupied, the coordinate information of the single child node is determined and encoded with the equal probability static binary arithmetic encoding method, and then signalled into the bitstream.

It is noted that the NC is used to indicate whether any of the neighbouring nodes coplanar with the current node is occupied. Specifically, in some implementations, the NC of the current node is determined as follows.

Occupancy bit information of a neighbouring node coplanar with the current node is determined. The NC is determined according to the occupancy bit information of the neighbouring node coplanar with the current node.

Here, the neighbouring nodes coplanar with the current node may include at least one of: a neighbouring node adjacent to the left side of the current node, a neighbouring node adjacent to the right side of the current node, a neighbouring node adjacent to the upper side of the current node, a neighbouring node adjacent to the lower side of the current node, a neighbouring node adjacent to the rear side of the current node, or a neighbouring node adjacent to the front side of the current node. In other words, there are typically 6 neighbouring nodes that are coplanar with the current node, as illustrated in FIG. 2.

It is also to be noted that the occupancy bit information of the neighbouring node is determined based on the presence or absence of a point(s) in the neighbouring node. In a specific implementation, the occupancy bit information of the neighbouring node of the current node may be obtained as follows.

When a neighbouring node is occupied by a point, it is determined that occupancy bit information of the neighbouring node is equal to the first value. When the neighbouring node is not occupied by a point, it is determined that the occupancy bit information of the neighbouring node is equal to the second value.

In this disclosure, the first value may be 1 and the second value may be 0; or, the first value may be 0 and the second value may be 1. In one specific example, the first value may be set to 1 and the second value may be set to 0, but without specific limitation.

For example, the first value is 1 and the second value is 0. Among the 6 neighbouring nodes coplanar with the current node, if a neighbouring node is occupied by a point, then the occupancy bit information of that neighbouring node is equal to 1. If a neighbouring node is not occupied by any point, then the occupancy bit information of that neighbouring node is equal to 0. Thus, based on the occupancy bit information of the 6 neighbouring nodes of the current node, the NC may be calculated. For example, if there is no occupied neighbouring node among the 6 neighbouring nodes and the binary representation is 000000, then the NC may be calculated to be 0. Conversely, if there is an occupied neighbouring node(s) among the 6 neighbouring nodes and the binary representation is 000001~111111, then the NC is calculated to be 1~63, i.e., the NC is greater than 0.

In other words, the NC may reflect whether the current node has a neighbouring node that is occupied. In some implementations, the method may further include the following.

When the NC is greater than 0, it is determined that a neighbouring node of the current node is occupied. When the NC is equal than 0, it is determined that no neighbouring node of the current node is occupied.

In this disclosure, the NC is in the range of 0 to 63, i.e., if the NC is greater than 0, it indicates that the current node has an occupied neighbouring node, and if the NC is equal to 0, it indicates that the current node has no occupied neighbouring node.

Further, in some implementations, the coordinate information of the single child node may be determined as follows.

Occupancy bit information of child nodes partitioned from the current node is obtained. The number of occupied child nodes is determined according to the occupancy bit information of the child nodes.

That is, after obtaining the occupancy bit information of the 8 child nodes partitioned from the current node, the coordinate information of the single child node may be calculated based on the occupancy bit information of these 8 child nodes. Then, when the NC indicates that a neighbouring node of the current node is occupied and the flag information of the single child node indicates that only one of the child nodes partitioned from the current node is occupied, the coordinate information of the single child node may then be entropy encoded using the second context model and signalled into the bitstream.

It can be understood that prior to operations at S402, it is also necessary to determine a value of a single child node enabled variable. Accordingly, in some implementations, the method may further include the following.

The value of the single child node enabled variable is determined.

Accordingly, for S402, the context model may be determined according to the occupancy bit information of the neighbouring nodes as follows.

The context model is determined according to the occupancy bit information of the neighbouring nodes when the value of the single child node enabled variable indicates that the current node is in a single child node enabled state.

It should be noted that the new variable is introduced in the disclosure, namely the single child node enabled variable (which may be represented by ctxSingleChildEnabled). When the value of the single child node enabled variable indicates that the current node is in the single child node enabled state, it is then necessary to determine the context model, such as the first context model and the second context model, so that the first context model and the second context model may be used to entropy encode the related information of the current node.

It should also be noted that the single child node enabled variable is related to the number of nodes (denoted by $N_{all}$) and the number of single child nodes (denoted by $N_{singe}$). Specifically, in some implementations, the value of the single child node enabled variable may be determined as follows.

The number of nodes and the number of single child nodes are determined. A division operation is performed on the number of single child nodes and the number of nodes to obtain a first ratio. The first ratio is compared with a first threshold. The value of the single child node enabled variable is determined according to a comparison result between the first ratio and the first threshold.

In a specific implementation, the value of the single child node enabled variable may be determined according to the comparison result between the first ratio and the first threshold as follows.

When the first ratio is greater than the first threshold, the value of the single child node enabled variable is determined as a third value, and when the first ratio is less than or equal to the first threshold, the value of the single child node enabled variable is determined as a fourth value.

In this disclosure, the third value may be 1 and the fourth value may be 0; or, the third value may be 0 and the fourth value may be 1. In one specific example, the third value may be set to 1 and the fourth value may be set to 0, but without specific limitation.

It is to be noted that the first threshold may be used as a measure for determining the value of the single child node enabled variable. In the present disclosure, the first threshold may be a preset fixed value (e.g., obtained based on empirical values), a value determined by an adaptive algorithm, or even a value signalled by the encoder into the bitstream to allow the decoder to obtain the value by parsing the bitstream. Here, the first threshold is in a range [0, 1], which can be adjusted according to actual needs. In one specific example of the present disclosure, the first threshold may be set to 0.8, which is not specifically limited herein.

It is also noted that the single child node enabled variable may be represented by ctxSingleChildEnabled. The single child node enabled variable may be determined according to a formula illustrated below:

$$ctx \text{ Single Child Enabled} = \begin{cases} 1, & \text{if } N_{singe} \div N_{all} > 0.8 \\ 0, & \text{otherwise} \end{cases} \quad (1)$$

where $N_{singe} \div N_{all}$ represents the first ratio. In this case, if the first ratio is greater than 0.8, then ctxSingleChildEnabled is 1; otherwise, if the first ratio is less than or equal to 0.8, then ctxSingleChildEnabled is 0.

Further, in some implementations, the method may further include the following.

If the value of the single child node enabled variable is 1, it is determined that the current node is in the single child node enabled state. If the value of the single child node enabled variable is 0, it is determined that the current node is in the single child node disabled state.

That is, if ctxSingleChildEnabled=1, then the current node is in the single child node enabled state, and in this case the point cloud encoding method described in the implementations of the present disclosure may be executed. If ctxSingleChildEnabled=0, then the current node is in the single child node disabled state, and in this case the point cloud encoding method in the related art may be executed, i.e., the occupancy bits of the 8 child nodes of the current node are encoded with CABAC and signalled into the bitstream.

It is also to be noted that in the implementations of the present disclosure, $N_{singe}$ and $N_{all}$ are continuously updated. In some implementations, the method may further include the following.

Octree partitioning is performed on the input point cloud to obtain an octree of K layers. For an i-th layer of the octree, an initial value of the number of nodes is set to 0, an initial value of the number of single child nodes is set to 0, and an initial value of the single child node enabled variable is set to 0, where i is an integer greater than or equal to 0 and less than K.

Here, K represents the number of layers of the octree, and K is an integer greater than 0. For each layer of the octree, the number of nodes, the number of single child nodes, and the value of the single child node enabled variable are initialized at first, i.e., the initial value of the number of nodes is assigned to 0, the initial value of the number of single child nodes is assigned to 0, and the initial value of the single child node enabled variable is assigned to 0.

Further, when the current node is in the i-th layer, the number of nodes and the number of single child nodes may be determined as follows.

The number of nodes is obtained based on encoded nodes in the i-th layer. The number of single child nodes is obtained by determining, from the encoded nodes, an encoded node with only one occupied child node.

It is noted that both the number of nodes and the number of single child nodes refer to encoded nodes in the i-th layer. For the number of single child nodes, the number of single child nodes may be obtained by determining, from the encoded nodes, the encoded node with only one occupied child node as follows.

For each of the encoded nodes, determine whether only one of child nodes partitioned from the encoded node is occupied. Based on a determination that only one of the child nodes partitioned from the encoded node is occupied, the number of single child nodes is updated by incrementing the number of single child nodes by 1. Based on a determination that not only one of the child nodes partitioned from the encoded node is occupied, the number of single child nodes is maintained unchanged.

In other words, after octree partitioning of the input point cloud, the octree of K layers is obtained. For the i-th layer the octree, values of the number of nodes ($N_{all}$), the number of single child nodes ($N_{singe}$) and the single child node enabled variable (ctxSingleChildEnabled) are initialized, i.e. assigning $N_{all}$=0, $N_{singe}$=0, and ctxSingleChildEnabled=0. Then for the i-th layer, after point cloud encoding has been performed on the j-th node in the i-th layer, update $N_{all}$=$N_{all}$+1, i.e., the number of nodes indicates the number of nodes that have been encoded. If child nodes partitioned from the j-th node includes only one occupied child node (i.e., $N_{oc}$=1), then update $N_{singe}$=$N_{singe}$+1, i.e., the number of single child nodes indicates the number of encoded nodes with only one occupied child node among the encoded nodes. When j is less than N, then update j=j+1, the operation of reading the j-th node in the i-th layer is continued until all nodes in the i-th layer have been processed, j being an integer greater than or equal to 0 and less than N, N being the total number of nodes in the i-th layer. Next, process the (i+1)-th layer of the octree until all K layers of the octree have been processed.

In this way, after determining $N_{singe}$ and $N_{all}$, the value of the single child node enabled variable (ctxSingleChildEnabled) may be calculated with formula (1), so as to determine whether the context model is required for subsequent entropy encoding.

Specifically, in this disclosure, if the NC indicates that the current node has an occupied neighbouring node, then NC>0, and if the value of the single child node enabled variable indicates that the current node is in the single child node enabled state, then ctxSingleChildEnabled=1. That is, this disclosure proposes a new geometry information entropy coding based on point cloud neighbouring nodes, in order to extend application of the single child node coordinate information coding to a case where $N_{oc}$==1 (the 8 child nodes include only one occupied child node) but NC>0 (the 6 neighbouring nodes include an occupied neighbouring node), when the child nodes of the neighbouring nodes are not used to construct the context model (i.e., adjacent_child_contextualization_enabled_flag==0), the method of constructing the context model is used.

In other words, in this disclosure, in the case that the child nodes of the neighbouring node are not used to construct the context model (adjacent_child_contextualization_enabled_flag==0), the occupancy bit information of the neighbouring nodes may be used to construct the context model, and then the coordinate information of the single child node may be encoded using CABAC, which may further improve the coding efficiency.

In the syntax description, "adjacent_child_contextualization_enabled_flag equal to 1 indicates that the adjacent child nodes of neighbouring octree nodes are used for bit-wise occupancy contextualization", which means that when the syntax element adjacent_child_contextualization_enabled_flag is 1, the child nodes of neighbouring nodes may be used for context model construction for occupancy bit information coding. "adjacent_child_contextualization_enabled_flag equal to 0 indicates that when the syntax element adjacent_child_contextualization_enabled_flag is 0, the child nodes of neighbouring octree nodes are is not used for the occupancy contextualization", which means that when the syntax element adjacent_child_contextualization_enabled_flag is 0, the child nodes of neighbouring nodes are not used for context model construction for occupancy bit information encoding.

The following is a detailed description of the process of using the occupancy bit information of neighbouring nodes to construct the first context model and the second context model.

In some implementations, when the value of the single child node enabled variable indicates that the current node is in the single child node enabled state, for the first context model, the context model may be determined according to the occupancy bit information of the neighbouring nodes as follows.

The prediction flag information of the current node is determined based on the occupancy bit information of the neighbouring nodes. The first context model is determined based on the prediction flag information of the current node.

It is to be noted that the determination of the first context model is related to the prediction flag information of the current node, where the prediction flag information of the current node is determined according to the occupancy bit information of the neighbouring nodes. In a specific implementation, the prediction flag information of the current node may be determined according to the occupancy bit information of the neighbouring nodes as follows.

According to the occupancy bit information of the neighbouring nodes, a first number of nodes each occupied by a point is determined among neighbouring nodes coplanar with the current node. The prediction flag information of the current node is determined according to the first number of nodes It is also to be noted that the first number of nodes here refers to the number of occupied nodes among the neighbouring nodes coplanar with the current node. Specifically, as illustrated in FIG. 2, there are a total of 6 neighbouring nodes coplanar with the current node, namely: the neighbouring node adjacent to the left side of the current node, the neighbouring node adjacent to the right side of the current node, the neighbouring node adjacent to the upper side of the current node, the neighbouring node adjacent to the lower side of the current node, the neighbouring node adjacent to the rear side of the current node, and the neighbouring node connected adjacent to the front side of the current node. Then the first number of nodes is determined from these 6 neighbouring nodes.

In this disclosure, the first number of nodes may be represented by $N_{on}$ which indicates the number of occupied neighbouring nodes among the 6 neighbouring nodes coplanar with the current node. $N_{on}$ may take values from 0 to 6.

Further, after obtaining the first number of nodes, the first number may be used to determine the prediction flag information for the current node. In some implementations, the prediction flag information of the current node may be determined according to the first number of nodes as follows.

The first number of nodes is compared with a second threshold value. The prediction flag information of the current node is determined according to a comparison result between the first number of nodes and the second threshold value.

In a specific implementation, the prediction flag information of the current node is determined according to the comparison result between the first number of nodes and the second threshold as follows.

When the first number of nodes is less than the second threshold, the prediction flag information of the current node is determined as a fifth value. When the first number of nodes is greater than or equal to the second threshold, the prediction flag information of the current node is determined as a sixth value.

In this disclosure, the fifth value may be 1 and the sixth value may be 0; or, the fifth value may be 0 and the sixth value may be 1. In one specific example, the fifth value may be set to 1 and the sixth value may be set to 0, but without specific limitation.

Further, the second threshold may be used as a measure for determining the value of the prediction flag information of the current node. In the present disclosure, the second threshold may be a preset fixed value, a value determined using an adaptive algorithm, or even a value signalled by the encoder into the bitstream to allow the decoder to obtain the value by parsing the bitstream. Here, the second threshold is in a range of [0, 6], which can be adjusted according to actual needs. In one specific example of the present disclosure, the second threshold may be set to 3, which is not specifically limited.

In one specific implementation, by predicting the flag information (e.g., a flag) with $N_{on}$, two context models may be constructed as illustrated below.

For the syntax element single_child_flag:

$$\text{prediction flag} = \begin{cases} 0, & \text{if } N_{on} < 3 \\ 1, & \text{otherwise} \end{cases} \tag{2}$$

Figure 5:
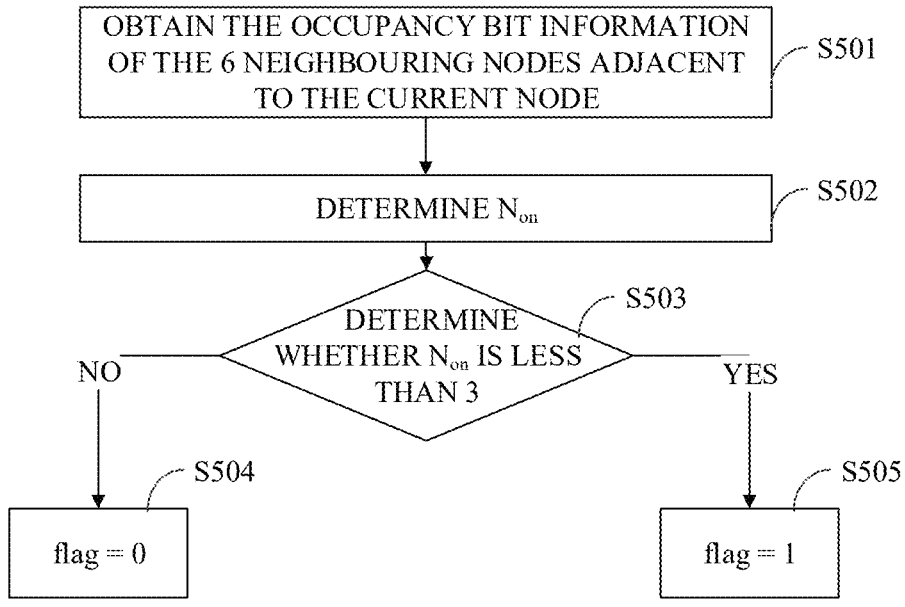
FIG. 5 is a schematic flowchart of a process for predicting flag information according to neighbouring nodes provided in implementations of the present disclosure.

Referring to FIG. 5, FIG. 5 illustrates a schematic flowchart of a process for predicting flag information based on neighbouring nodes provided in implementations of the present disclosure. As illustrated in FIG. 5, the process may include the following.

At S501, obtain the occupancy bit information of the 6 neighbouring nodes adjacent to the current node.

At S502, determine $N_{on}$.

At S503, determine whether $N_{on}$ is less than 3.

At S504, if $N_{on}$ is not less than 3, then flag=0.

At S505, $N_{on}$ is less than 3, then flag=1.

It should be noted that in terms of predicting the flag information (flag), for S503, whether $N_{on}<3$ is determined. If $N_{on}$ is not less than 3, then S504 is executed, and if $N_{on}<3$, then S505 is executed.

In other words, after obtaining $N_{on}$, the prediction value of the flag information may be determined according to $N_{on}$, and further the index value of the first context model may be determined. Then from the two first candidate context models illustrated in formula (2), the first candidate context model corresponding to the index value may be selected as the first context model.

In some implementations, when the value of the single child node enabled variable indicates that the current node is in the single child node enabled state, for the second context model, the context model may be determined according to the occupancy bit information of the neighbouring nodes as follows.

The prediction coordinate information of the current node is determined according to the occupancy bit information of the neighbouring nodes. The second context model is determined according to the prediction coordinate information of the current node.

It is to be noted that the determination of the second context model is related to the prediction coordinate information of the current node, where the prediction coordinate information is determined by the occupancy bit information of neighbouring nodes. In a specific implementation, the prediction coordinate information of the current node may be determined according to the occupancy bit information of the neighbouring nodes as follows.

According to the occupancy bit information of the neighbouring nodes, determine a second number of nodes each occupied by a point among neighbouring nodes in a first plane corresponding to a coordinate value in a first direction equal to a seventh value, a third number of nodes each occupied by a point among neighbouring nodes in a second plane corresponding to a coordinate value in a second direction equal to the seventh value, and a fourth number of nodes each occupied by a point among neighbouring nodes in a third plane corresponding to a coordinate value in a third direction equal to the seventh value. The second number of nodes is compared with a third threshold, and a first $1^{st}$ prediction value in the first coordinate direction is determined according to a comparison result. The third number of nodes is compared with the third threshold, and a second $1^{st}$ prediction value in a second coordinate direction is determined according to a comparison result. The fourth number of nodes is compared with the third threshold, and a third $1^{st}$ prediction value in a third coordinate direction is determined according to a comparison result. A first set of prediction coordinate information of the current node is obtained according to the first $1^{st}$ prediction value, the second $1^{st}$ prediction value, and the third $1^{st}$ prediction value.

Here, the seventh value may be $-1$, or the seventh value may be 1. In one specific example, the seventh value may be $-1$, which is not specifically limited.

In addition, the third threshold may be used as a measure for determining the value of the prediction coordinate information of the current node. In the present disclosure, the third threshold may be a preset fixed value, a value determined using an adaptive algorithm, or even a value signalled by the encoder into the bitstream to allow the decoder to obtain the value by parsing the bitstream. In implementations of the disclosure, the third threshold can be adjusted according to actual needs, which is not specifically limited herein. In one specific example, the third threshold may be set to 0.

It should be noted that the coordinate information includes a coordinate value in the first direction, a coordinate value in the second direction, and a coordinate value in the third direction. Here, the first direction may be the horizontal axis (x-axis) direction, the second direction may be the vertical axis (y-axis) direction and the third direction may be the third axis (z-axis) direction.

It should also be noted that the second number of nodes may be represented by $N_{x=-1}$ which indicates the number of occupied nodes among 9 neighbouring nodes in the yz-plane with coordinate value $-1$ in the x-axis direction. $N_{x=-1}$ may take the value from 0 to 9. The third number of nodes may be represented by $N_{y=-1}$ which indicates the number of occupied nodes among 9 neighbouring nodes in the xz-plane with coordinate value $-1$ in the y-axis direction. $N_{y=-1}$ may take the value from 0 to 9. The fourth number of nodes may be represented by $N_{z=-1}$ which indicates the number of occupied nodes among 9 neighbouring nodes in the xy-plane with coordinate value $-1$ in the z-axis direction. $N_{z=-1}$ may take the value from 0 to 9.

Figure 6:
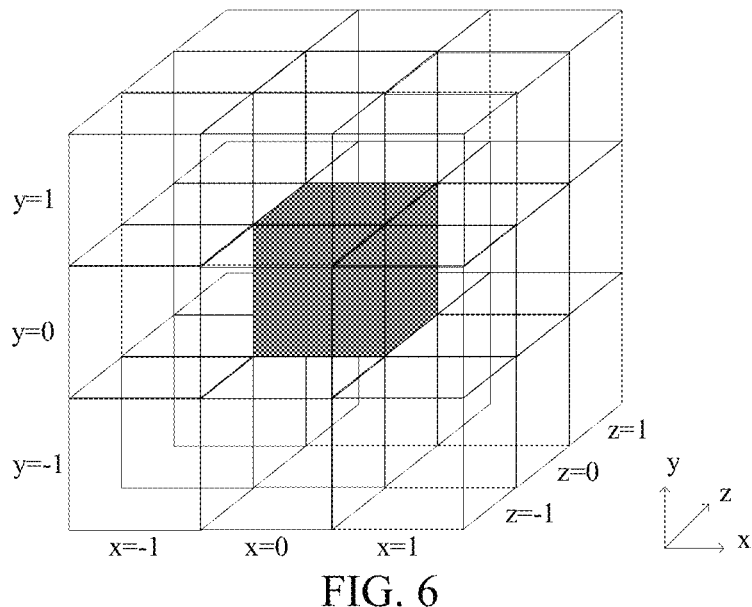
FIG. 6 is a schematic structural diagram illustrating locations of a current node and 26 neighbouring nodes provided in implementations of the present disclosure.

Exemplarily, as illustrated in FIG. 6, the current node is filled with black, and there are 26 neighbouring nodes adjacent to the current node. Assuming that the seventh value is equal to $-1$, $N_{x=-1}$ may be defined as the number of occupied nodes among the 9 neighbouring nodes in the yz-plane with coordinate value of $-1$ in the x-axis direction. The coordinate value in the x-axis direction of a single child node of the current node may be predicted through $N_{x=-1}$ (i.e., the first $1^{st}$ prediction value, denoted by $X_0$), from which 2 context models may be constructed, as illustrated as follows.

For the syntax element occupancy_idx[2]:

$$\text{prediction coordinate value } X_0 = \begin{cases} 0, & \text{if } N_{x=-1} > 0 \\ 1, & \text{otherwise} \end{cases} \qquad (3)$$

Assuming that the seventh value is equal to $-1$, $N_{y=-1}$ may be defined as the number of occupied nodes among the 9 neighbouring nodes in the xz-plane with coordinate value of $-1$ in the y-axis direction. The coordinate value in the y-axis direction of the single child node of the current node may be predicted through $N_{y=-1}$ (i.e., the second $1^{st}$ prediction value, denoted by $Y_0$), from which 2 context models may be constructed, as illustrated as follows.

For the syntax element occupancy_idx[1]:

$$\text{prediction coordinate value } Y_0 = \begin{cases} 0, & \text{if } N_{y=-1} > 0 \\ 1, & \text{otherwise} \end{cases} \qquad (4)$$

Assuming that the seventh value is equal to $-1$, $N_{z=-1}$ may be defined as the number of occupied nodes among the 9 neighbouring nodes in the xy-plane with coordinate value of $-1$ in the z-axis direction. The coordinate value in the z-axis direction of the single child node of the current node may be predicted through $N_{z=-1}$ (i.e., the third $1^{st}$ prediction value, denoted by $Z_0$), from which 2 context models may be constructed, as illustrated as follows.

For the syntax element occupancy_idx[0]:

$$\text{prediction coordinate value } Z_0 = \begin{cases} 0, & \text{if } N_{z=-1} > 0 \\ 1, & \text{otherwise} \end{cases} \qquad (5)$$

Figure 7:
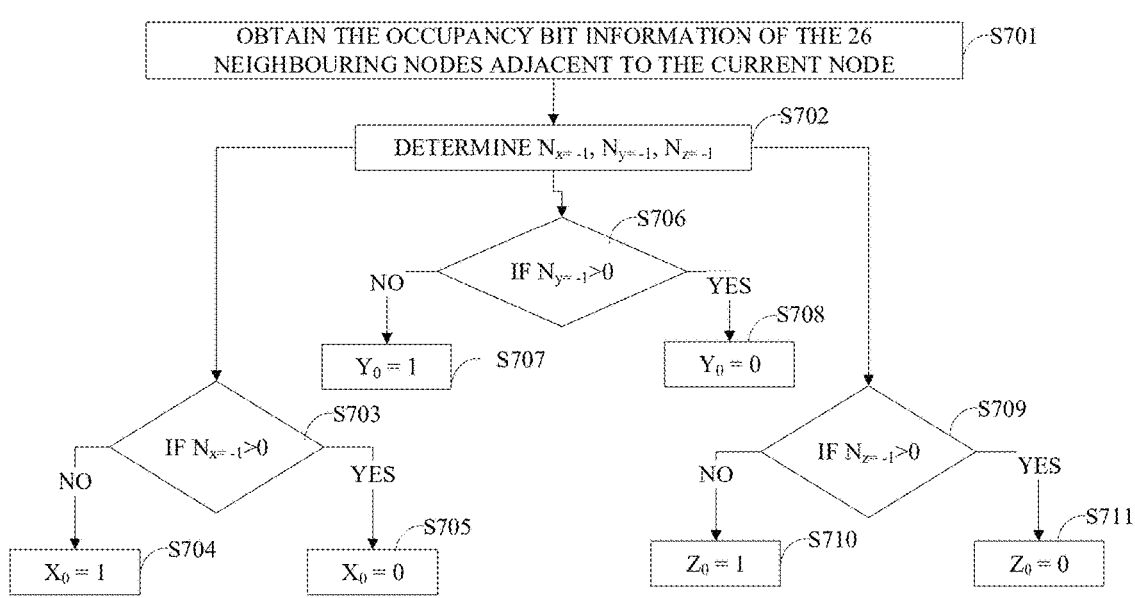
FIG. 7 is a schematic diagram of a process for predicting coordinate information based on neighbouring nodes provided in an implementation of the present disclosure.

Referring to FIG. 7, FIG. 7 is a schematic flowchart of a process for predicting coordinate information based on neighbouring nodes provided in implementations of the present disclosure. As illustrated in FIG. 7, the process may include the following.

At S701, obtain the occupancy bit information of the 26 neighbouring nodes adjacent to the current node.

At S702, determine $N_{x=-1}$, $N_{y=-1}$, and $N_{z=-1}$.

At S703, determine whether $N_{x=-1} > 0$.

At S704, if $N_{x=-1}$ is not greater than 0, then $X_0 = 1$.

At S705, if $N_{x=-1} > 0$, then $X_0 = 0$.

At S706, determine whether $N_{y=-1} > 0$.

At S707, if $N_{y=-1}$ is not greater than 0, then $Y_0 = 1$.

At S708, if $N_{y=-1} > 0$, then $Y_0 = 0$.

At S709, determine whether $N_{z=-1} > 0$.

At S710, if $N_{z=-1}$ is not greater than 0, then $Z_0 = 1$.

At S711, if $N_{z=-1} > 0$, then $Z_0 = 0$.

It should be noted that for S703, whether $N_{x=-1} > 0$ is determined. If $N_{x=-1}$ is not greater than 0, then S704 is executed, and if $N_{x=-1} > 0$, then S705 is executed. For S706, whether $N_{y=-1} > 0$ is determined. If $N_{y=-1}$ is not greater than 0, then S707 is executed, and if $N_{x=-1} > 0$, then S708 is executed. For S709, whether $N_{z=-1} > 0$ is determined. If $N_{z=-1}$ is not greater than 0, then S710 is executed, and if $N_{z=-1} > 0$, then S711 is executed.

It should also be noted that in another specific implementation, the prediction coordinate information of the current node may be determined according to the occupancy bit information of the neighbouring nodes as follows.

According to the occupancy bit information of the neighbouring node, determine a fifth number of nodes each occupied by a point among neighbouring nodes in a first plane corresponding to the coordinate value in the first direction equal to an eighth value, a sixth number of nodes each occupied by a point among neighbouring nodes in a second plane corresponding to the coordinate value in the second direction equal to the eighth value, and a seventh number of nodes occupied by a point among neighbouring nodes in a third plane corresponding to the coordinate value in the third direction equal to the eighth value. The fifth number of nodes is compared with a fourth threshold, and a first $2^{nd}$ prediction value in the first coordinate direction is determined according to a comparison result. The sixth number of nodes is compared with the fourth threshold, and a second $2^{nd}$ prediction value in the second coordinate direction is determined according to a comparison result. The seventh number of nodes is compared with the fourth threshold, and a third $2^{nd}$ prediction value in the third coordinate direction is determined according to a comparison result. A second set of prediction coordinate information of the current node is determined according to the first $2^{nd}$ prediction value, the second $2^{nd}$ prediction value, and the third $2^{nd}$ prediction value.

In implementations of the present disclosure, the seventh value may be $-1$ and the eighth value may be 1; or, the seventh value may be 1 and the eighth value may be $-1$. In one specific example, the seventh value may be $-1$ and the eighth value may be 1, but without specific limitation.

In addition, the fourth threshold may be used as a measure for determining the value of the prediction coordinate information of the current node. In this disclosure, the fourth threshold may a preset fixed value, a value determined using an adaptive algorithm, or even a value signalled by the encoder into the bitstream to allow the decoder to obtain the value by parsing the bitstream. In implementations of the present disclosure, the fourth threshold may be the same as or different from the third threshold, which may be adjusted according to the actual situation and is not specifically limited here. In one specific example, the fourth threshold may also be set to 0.

It should also be noted that the fifth number of nodes may be represented by $N_{x=1}$ which indicates the number of occupied nodes among 9 neighbouring nodes in the yz-plane with coordinate value 1 in the x-axis direction. $N_{x=1}$ may take the value from 0 to 9. The sixth number of nodes may be represented by $N_{y=1}$ which indicates the number of occupied nodes among 9 neighbouring nodes in the xz-plane with coordinate value 1 in the y-axis direction. $N_{y=1}$ may take the value from 0 to 9. The seventh number of nodes may be represented by $N_{z=1}$ which indicates the number of occupied nodes among 9 neighbouring nodes in the xy-plane with coordinate value 1 in the z-axis direction. $N_{z=1}$ may take the value from 0 to 9.

Still taking FIG. 6 as an example, assuming that the eighth value is equal to 1, $N_{x=1}$ may be defined as the number of occupied nodes among the 9 neighbouring nodes in the yz-plane with coordinate value of 1 in the x-axis direction. The coordinate value in the x-axis direction of a single child node of the current node may be predicted through $N_{x=1}$ (i.e., the first $2^{nd}$ prediction value, denoted by $X_1$), from which 2 context models may be constructed as illustrated as follows.

For the syntax element occupancy_idx[2]:

$$\text{prediction coordinate value } X_1 = \begin{cases} 1, \text{ if } N_{x=1} > 0 \\ 0, \text{ otherwise} \end{cases} \qquad (6)$$

Assuming that the eighth value is equal to 1, $N_{y=1}$ may be defined as the number of occupied nodes among the 9 neighbouring nodes in the xz-plane with coordinate value of 1 in the y-axis direction. The coordinate value in the y-axis direction of the single child node of the current node may be predicted through $N_{y=1}$ (i.e., the second $2^{nd}$ prediction value, denoted by $Y_1$), from which 2 context models may be constructed as illustrated as follows.

For the syntax element occupancy_idx[1]:

$$\text{prediction coordinate value } Y_1 = \begin{cases} 1, \text{ if } N_{y=1} > 0 \\ 0, \text{ otherwise} \end{cases} \qquad (7)$$

Assuming that the eighth value is equal to 1, $N_{z=1}$ may be defined as the number of occupied nodes among the 9 neighbouring nodes in the xy-plane with coordinate value of 1 in the z-axis direction. The coordinate value in the z-axis direction of the single child node of the current node may be predicted through $N_{z=1}$ (i.e., the third $2^{nd}$ prediction value, denoted by $Z_1$), from which 2 context models may be constructed as illustrated as follows.

For the syntax element occupancy_idx[0]:

$$\text{prediction coordinate value } Z_1 = \begin{cases} 1, \text{ if } N_{z=-1} > 0 \\ 0, \text{ otherwise} \end{cases} \qquad (8)$$

Figure 8:
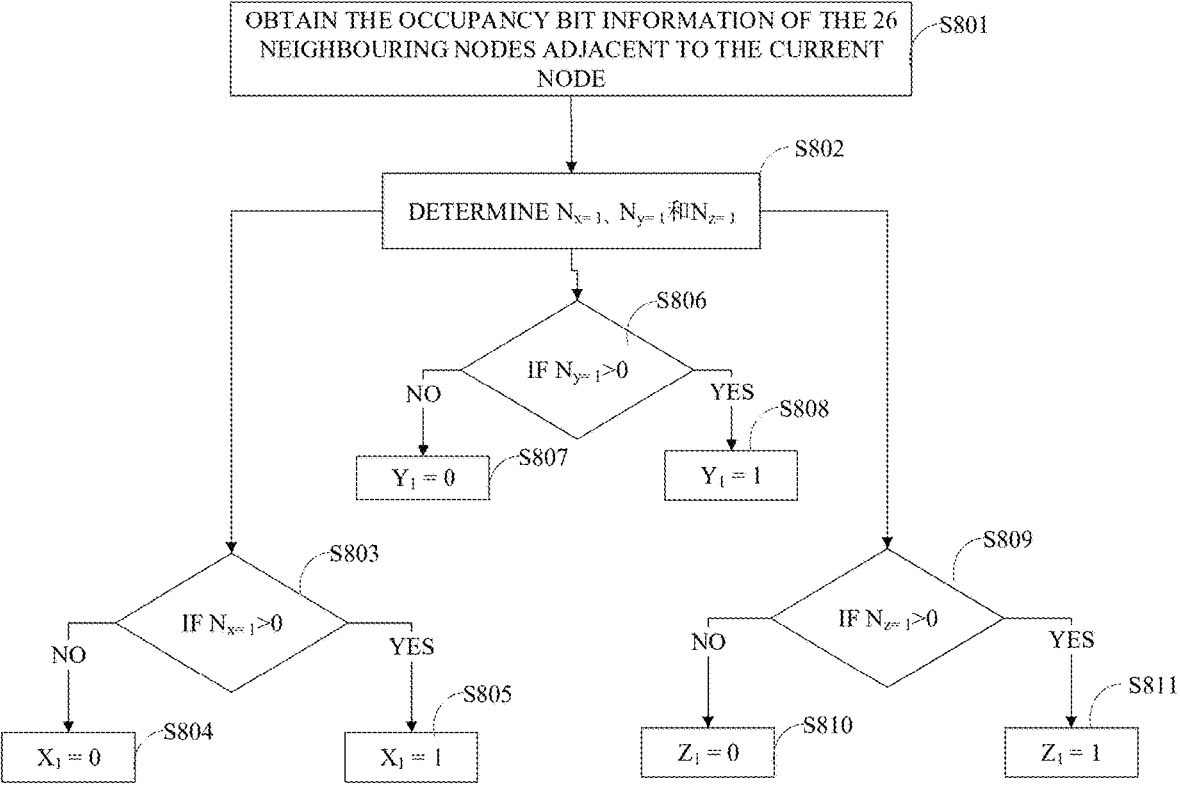
FIG. 8 is a schematic diagram of another process for predicting coordinate information according to neighbouring nodes provided in implementations of the present disclosure.

Referring to FIG. 8, FIG. 8 is a schematic flowchart of a process for predicting coordinate information based on neighbouring nodes provided in another implementation of the present disclosure. As illustrated in FIG. 8, the process may include the following.

At S801, obtain the occupancy bit information of the 26 neighbouring nodes adjacent to the current node.

At S802, determine $N_{x=1}$, $N_{y=1}$, and $N_{z=1}$.

At S803, determine whether $N_{x=1}>0$.

At S804, if $N_{x=1}$ is not greater than 0, then $X_1=0$.

At S805, if $N_{x=1}>0$, then $X_1=1$.

At S806, determine whether $N_{y=1}22\ 0$.

At S807, if $N_{y=1}$ is not greater than 0, then $Y_1=0$.

At S808, if $N_{y=1}22\ 0$, then $Y_1=1$.

At S809, determine whether $N_{z=1}>0$.

At S810, if $N_{z=1}$ is not greater than 0, then $Z_1=0$.

At S811, if $N_{z=1}>0$, then $Z_1=1$.

It should be noted that for S803, whether $N_{x=1}>0$ is determined. If $N_{x=1}$ is not greater than 0, then S804 is executed, and if $N_{x=1}>0$, then S805 is executed. For S806, whether $N_{y=1}>0$ is determined. If $N_{y=1}$ is not greater than 0, then S807 is executed, and if $N_{x=1}>0$, then S808 is executed. For S809, whether $N_{z=1}>0$ is determined. If $N_{z=1}$ is not greater than 0, then S810 is executed, and if $N_{z=1}>0$, then S811 is executed.

In this way, according to the process illustrated in FIG. 7, the first set of prediction coordinate information of the current node may be obtained, and according to the process illustrated in FIG. 8, the second set of prediction coordinate information of the current node may be obtained. According to these two sets of prediction coordinate information, the second context model may be determined. Specifically, in some implementations, the second context model may be determined according to the prediction coordinate information of the current node as follows.

The first set of prediction coordinate information and the second set of prediction coordinate information of the current node are obtained. An index value of the second context model is obtained according to the first set of prediction coordinate information and the second set of prediction coordinate information. The second context model is determined according to the index value of the second context model.

Further, the index value of the second context model may be obtained according to the first set of prediction coordinate information and the second set of prediction coordinate information as follows.

The first $1^{st}$ prediction value and the first $2^{nd}$ prediction value in the first coordinate direction, the second $1^{st}$ prediction value and the second $2^{nd}$ prediction value in the second coordinate direction, and the third $1^{st}$ prediction value and the third $2^{nd}$ prediction value in the third coordinate direction are obtained according to the first set of prediction coordinate information and the second set of prediction coordinate information. An index value of the second context model in the first coordinate direction is determined according to the first 1st prediction value and the first $2^{nd}$ prediction value in the first coordinate direction. An index value of the second context model in the second coordinate direction is determined according to the second $1^{st}$ prediction value and the second $2^{nd}$ prediction value in the second coordinate direction. An index value of the second context model in the third coordinate direction is determined according to the third $1^{st}$ prediction value and the third $2^{nd}$ prediction value in the second coordinate direction.

That is, after obtaining the first $1^{st}$ prediction value and the first $2^{nd}$ prediction value in the first coordinate direction, the index value of the second context model in the first coordinate direction may be determined accordingly; after obtaining the second $1^{st}$ prediction value and the second $2^{nd}$ prediction value in the second coordinate direction, the index value of the second context model in the second coordinate direction may be determined accordingly; after obtaining the third $1^{st}$ prediction value and the third $2^{nd}$ prediction value in the third coordinate direction, the index value of the second context model in the third coordinate direction may be determined accordingly. Thus, the index value of the second context model is determined. A second candidate context model corresponding to the index value is then selected from the multiple second candidate context models as illustrated in formulas (3) to (8) as the second context model.

In this disclosure, the context model used to predict the flag information (flag) may include 2 context models. During the encoding process, the unique context index of the flag information is predicted according to the occupancy bit information of the neighbouring nodes of the current node, and one of the 2 context models is selected according to the index for subsequent CABAC of the flag information. The context models for predicting the coordinate information are constructed respectively for each of three coordinate directions (that is x/y/z coordinate directions), with 2×2=4 context models in each direction, so there are 12 context models in total in the three directions. During the encoding process, a unique context index is obtained based on the occupancy bits of the neighbouring nodes of the current node, and one of the 12 context models is selected based on the index for subsequent CABAC of the prediction coordinate values.

In addition, in another possible implementation, for the construction of the context model, as illustrated in FIG. 6, the occupancy bit information (occupancy bits) of the 26 neighbouring nodes of the current node is obtained, where the occupancy bit of a neighbouring node is 1 if the neighbouring node is occupied, otherwise the occupancy bit is 0. In this way, the NC may be calculated, which may range from 0 to $2^{26}$, i.e., from "26 zeros" to "26 ones" in binary. Thus, up to $2^{26}$ context models may be constructed according to the NC. Additionally, any n among the $2^{26}$ context models may be combined to obtain x context models, where x may take values from 1 to $2^{26}$.

In short, all the context models constructed above may be used to encode coordinate information and flag information. In a word, the occupancy bit information of the 26 neighbouring nodes of the current node may be used to construct the context model to perform CABAC on the coordinate information and the required flag information (flag) of the single child node of the current node.

The point cloud encoding method is provided in the implementations. The occupancy bit information of the neighbouring nodes of the current node is obtained. The context model is determined according to the occupancy bit information of the neighbouring nodes. The related information of the current node is entropy encoded with the context model and signalled into the bitstream, where the related information includes at least one of flag information of a single child node or coordinate information of the single child node. In this way, the context model is constructed using the occupancy bit information of the neighbouring nodes and then is used to entropy encode the flag information and coordinate information of the single child node, which can fully utilize the spatial correlation of the point cloud and thus the coding efficiency of the point cloud can be improved.

Figure 9:
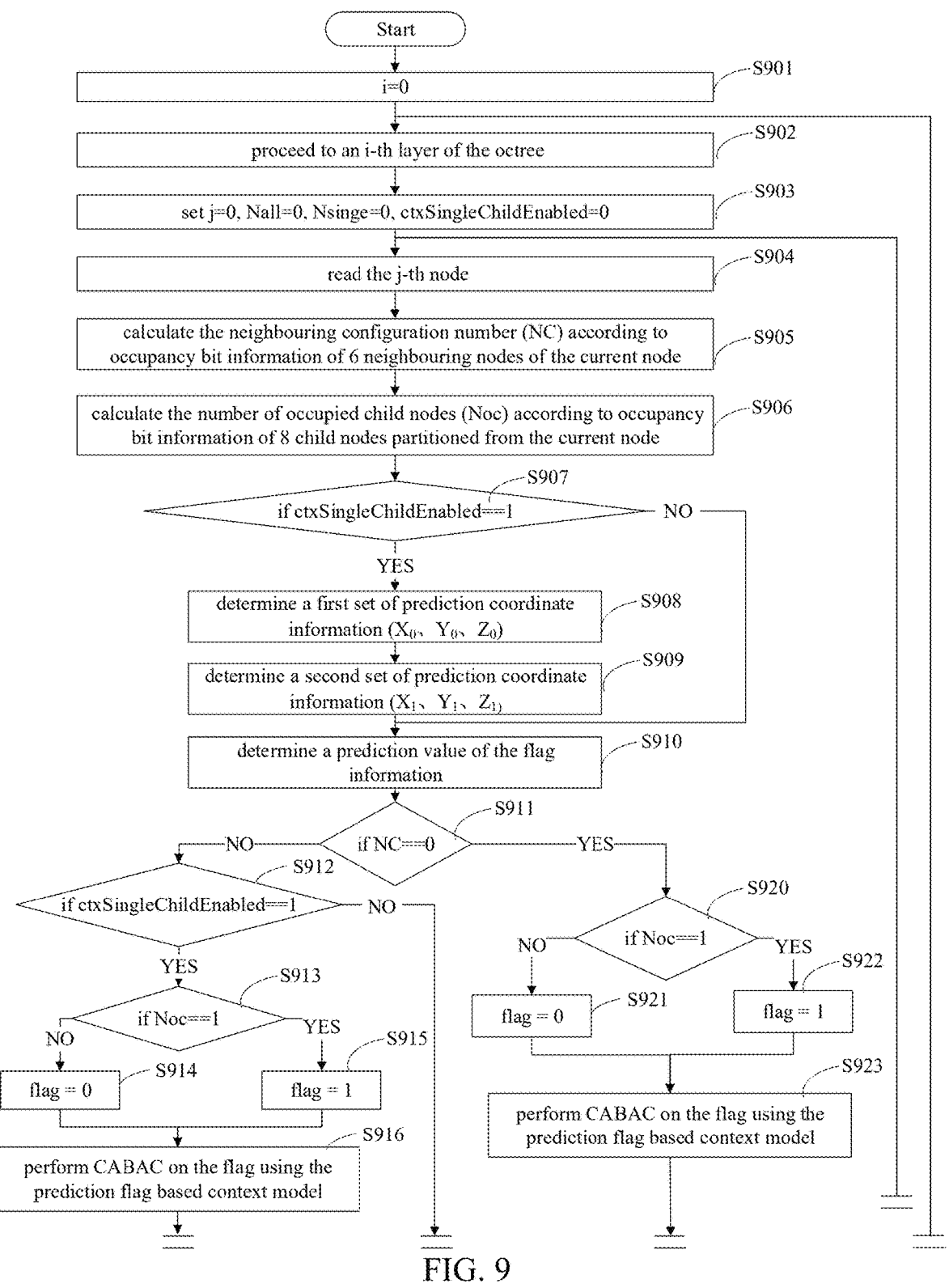
FIG. 9 is a schematic detailed flowchart of a point cloud encoding method provided in implementations of the present disclosure.
Figure 9:
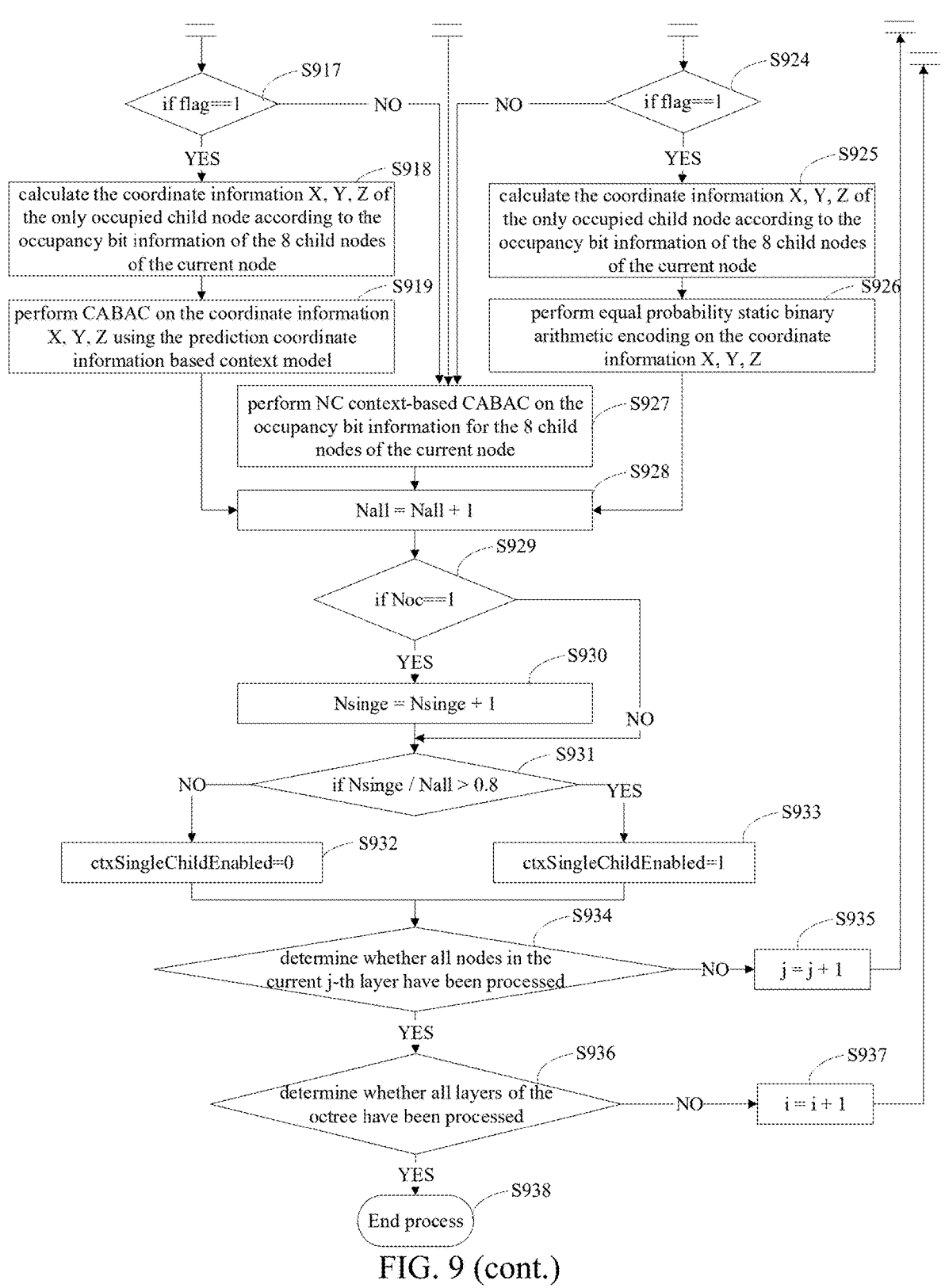

In another implementation of the present disclosure, referring to FIG. 9, FIG. 9 illustrates a schematic flowchart of a detailed process of a point cloud encoding method provided in implementations of the present disclosure. As illustrated in FIG. 9, the detailed process may include the following.

At S901, i=0.

At S902, proceed to an i-th layer of the octree.

Here, i is an integer greater than or equal to 0 and less than K. K denotes the number of layers into which the octree is partitioned. It should be noted that in this detailed process, proceed to the 0-th layer of the octree firstly.

At S903, set j=0, $N_{all}$=0, $N_{singe}$=0, and ctxSingleChildEnabled=0.

At S904, read the j-th node.

Here, j is an integer greater than or equal to 0 and less than N, and N is the total number of nodes in the i-th layer.

At S905, calculate the neighbouring configuration number (NC) according to occupancy bit information of 6 neighbouring nodes of the current node.

At S906, calculate the number of occupied child nodes ($N_{oc}$) according to occupancy bit information of 8 child nodes partitioned from the current node.

At S907, determine whether ctxSingleChildEnabled==1.

At S908, determine a first set of prediction coordinate information ($X_0$, $Y_0$, $Z_0$).

At S909, determine a second set of prediction coordinate information ($X_1$, $Y_1$, $Z_1$).

At S910, determine a prediction value of the flag information.

It should be noted that if the determination result for S907 is yes, then operations at S908 to S909 will be executed, and then operations at S910 will be executed. If the determination result for S907 is no, then operations at S910 will be executed directly.

At S911, determine whether NC==0.

At S912, if the determination result is no, then determine whether ctxSingleChildEnabled==1.

At S913, if the determination result is yes, then determine whether $N_{oc}$==1.

At S914, if the determination result is no, determine that flag=0.

At S915, if the determination result is yes, determine that flag=1.

It should be noted that at S913, whether $N_{oc}$ is equal to 1 is determined. If the determination result for S913 is no, then operations at S914 is executed; if the determination result for S913 is yes, then operations at S915 will be executed directly. After operations at S914 or S915, operations at S916 will be executed.

At S916, perform CABAC on the flag using the prediction flag based context model.

At S917, determine whether flag==1.

At S918, if the determination result is yes, calculate the coordinate information X, Y, Z of the only occupied child node according to the occupancy bit information of the 8 child nodes of the current node.

At S919, perform CABAC on the coordinate information X, Y, Z using the prediction coordinate information based context model.

It should be noted that at S917, whether the flag is equal to 1 is determined. If the determination result is yes, operations at S918~S919 are executed; if the determination result is no, operations at S927 is executed.

It should also be noted that for operations at S911, if the determination result is no, operations at S912 is executed, and if the determination result is yes, S920 is executed. For operations at S912, if the determination result is yes, operations at S913 is executed, and if the determination result is no, operations at S927 is executed.

At S920, if the determination result is yes, determine whether $N_{oc}$==1.

At S921, if the determination result is no, determine that flag=0.

At S922, if the determination result is yes, determine that flag=1.

At S923, perform CABAC on the flag using the prediction flag based context model.

It should be noted that for operations at S920, whether $N_{oc}$ is equal to 1 is determined. If the determination result is no, then operations at S921 is executed; if the determination result is yes, then operations at S922 will be executed directly. After operations at S921 or S922, operations at S923 will be executed.

At S924, determine whether flag==1.

At S925, if the determination result is yes, calculate the coordinate information X, Y, Z of the only occupied child node based on the occupancy bit information of the 8 child nodes of the current node.

At S926, perform equal probability static binary arithmetic encoding on the coordinate information X, Y, Z.

At S927, if the determination result is no, perform NC context-based CABAC on the occupancy bit information for the 8 child nodes of the current node.

At S928, $N_{all}$=$N_{all}$+1.

It should be noted that for operations at S912, S917 or S924, if the determination result is no, operations at S927 will be executed. After operations at S927, S919 or S926, operations at S928 will be executed.

At S929, determine whether $N_{oc}$==1.

At S930, if the determination result is yes, then $N_{singe}$=$N_{singe}$+1.

At S931, determine whether $N_{singe}/N_{all}$>0.8.

At S932, if the determination result is no, then ctxSingleChildEnabled=0.

At S933, if the determination result is yes, then ctxSingleChildEnabled=1.

At S934, determine whether all nodes in the current i-th layer have been processed.

At S935, if the determination result is no, then j=j+1 and return to S904.

At S936, if the determination result is yes, determine whether all layers of the octree have been processed.

At S937, if the determination result is no, then i=i+1 and return to S902.

At S938, if the determination result is yes, the process is ended.

It is noted that the process first proceeds to the i-th layer of the octree (the minimum value of i is 0), and assigns the number of nodes $N_{all}$=0, the number of single child nodes $N_{singe}$=0 and, the single child node enabled variable ctxSingleChildEnabled=0.

Then, the j-th node (the minimum value of j is 0) is read and NC is calculated according to the occupancy bit information (or called occupancy bit pattern) of the 6 neighboring nodes of the current node. Then according to the occupancy bit information of the 8 child nodes partitioned from the current node, $N_{oc}$ is calculated.

Next, when ctxSingleChildEnabled==1, according to the occupancy bit information of the 6 neighbouring nodes adjacent to the current node, $N_{on}$ is calculated and finally flag is predicted. According to the occupancy bit information of the 6 neighbouring nodes of the current node, $N_{x=-1}$, $N_{y=-1}$, and $N_{z=-1}$ are calculated and the first set of coordinate information $X_0$, $Y_0$, and $Z_0$ are predicted, and $N_{x=1}$, $N_{y=1}$, and $N_{z=1}$ are calculated and the second set of coordinate information $X_1$, $Y_1$, and $Z_1$ are predicted. When ctxSingleChildEnabled==0, the flag may also be predicted according to the occupancy bit information of the 6 neighbouring nodes adjacent to the current node.

Next, when NC==0 (the neighbouring configuration number is 0, i.e. none of the 6 neighbouring nodes is occupied), the flag assigned as 1 indicates a case where $N_{oc}$ is equal to 1 (i.e., only 1 of the 8 child nodes is occupied), the flag assigned as 0 indicates a case where $N_{oc}$ is not equal to 1 (i.e., more than 1 of the 8 child nodes are occupied). Since the prediction flag has been obtained, the flag may be encoded using adaptive binary arithmetic encoding based on the context "prediction flag" and signalled into the bitstream. When the flag is equal to 1, the coordinate information of the single child node (X/Y/Z coordinate values) are calculated based on the occupancy bit information of the 8 child nodes of the current node, and the X/Y/Z coordinate values are encoded with equal probability static binary arithmetic encoding and signalled into the bitstream.

When NC>0 (the 6 neighbouring nodes have an occupied neighbouring node) and ctxSingleChildEnabled==1, the flag assigned as 1 indicates a case where $N_{oc}$ is equal to 1 (i.e., only 1 child node out of 8 is occupied), the flag assigned as 0 indicates a case where $N_{oc}$ is not equal to 1 (i.e., more than 1 of the 8 child nodes are occupied), and the flag is encoded using adaptive binary arithmetic encoding based on the context "prediction flag" and signalled into the bitstream. When the flag is equal to 1, the coordinate information (X/Y/Z coordinate values) of the single child node is calculated based on the occupancy bit information of the 8 child nodes of the current node, and the X/Y/Z coordinate values are encoded using adaptive binary arithmetic encoding based on the context "prediction coordinate information" and signalled into the bitstream.

When flag==0 (more than 1 of the 8 child nodes are occupied), or NC>0 (the 6 neighbouring nodes have an occupied neighbouring node) and ctxSingleChildEnabled==0, then the occupancy bit information of the 8 child nodes of the current node is encoded using CABAC and signalled to the bitstream.

Finally, update $N_{all}=N_{all}+1$, and when $N_{oc}=1$, update $N_{singe}=N_{singe}+1$. The ctxSingleChildEnabled is calculated as below:

$$ctx\ Single\ Child\ Enabled = \begin{cases} 1, & \text{if } N_{singe} \div N_{all} > 0.8 \\ 0, & \text{otherwise} \end{cases} \quad (9)$$

If all nodes in the current i-th layer have been processed, then i=i+1, and return to S902 to process the next layer of the octree. Otherwise, j=j+1, and return to S904 to process the next node in the i-th layer. If all layers have been processed, then the process may be ended.

In short, the protection point of this disclosure is the construction of the context model of "prediction flag" and "prediction coordinate information" for encoding of the single child node, which improves the compression efficiency through CABAC. Additionally, enablement of the point cloud encoding method is controlled through a proportion of nodes with the single child node in all nodes.

That is, the technical solution of the present disclosure more fully exploits the spatial correlation of the point cloud and enables further improvement of the coding efficiency of G-PCC in the case where the child nodes of neighbouring nodes are not used for context model construction (adjacent_child_contextization_enabled_flag==0). Table 2 illustrates the BD-Rate under lossy compression of geometry information, which shows the percentage saved (negative BD-Rate) or increased (positive BD-Rate) of the coding bitrate of the present disclosure compared to the coding bitrate of the related technology, under the same coding quality. Table 3 illustrates the Bpip Ratio under lossless compression of geometry information, which illustrates the percentage of the coding bitrate of the present disclosure in the coding bitrate of the related technology, with no loss of point cloud quality, where the lower the numerical value, the greater the bitrate savings in the present disclosure.

TABLE 2

| Test Sequence | geometry BD-TotalRate (%) | |
| | D1 | D2 |
| --- | --- | --- |
| egyptian_mask_vox12 | −0.4% | −0.4% |
| longdress_viewdep_vox12 | −0.0% | −0.0% |
| ulb_unicorn_vox13 | −0.3% | −0.3% |
| landscape_00014_vox20 | −0.5% | −0.5% |
| overall | −0.3% | −0.3% |
| egyptian_mask_vox12 | −0.4% | −0.4% |

TABLE 3

| Test Sequence | geometry bpip ratio (%) D1 |
| --- | --- |
| egyptian_mask_vox12 | 99.3% |
| longdress_viewdep_vox12 | 96.5% |
| ulb_unicorn_vox13 | 99.5% |
| landscape_00014_vox20 | 99.5% |
| overall | 99.2% |
| egyptian_mask_vox12 | 99.3% |

The present implementations provide the point cloud encoding method, and the specific implementations is elaborated through the aforementioned description, from which it may be seen that since the context models are constructed separately for the flag information and coordinate information of the single child node, the entropy encoding of the flag information and coordinate information based on the constructed context model can make full use of the spatial correlation of the point cloud, and thus can improve the coding efficiency of the point cloud.

In another implementation of the present disclosure, a point cloud decoding method provided in this disclosure is applied to a video decoding device, i.e., a G-PCC decoder, which may also be referred to as a decoder for short. The functions implemented by the method may be achieved by a second processor in the decoder calling a computer program, which may be stored in a second memory. As can be seen, the decoder includes at least the second processor and the second memory.

Figure 10:
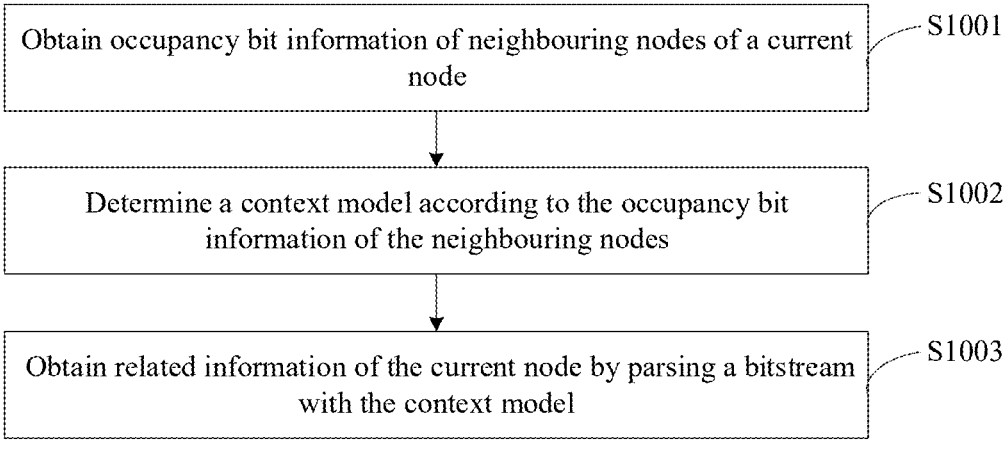
FIG. 10 is a schematic flowchart of a point cloud decoding method provided in implementations of the present disclosure.

Referring to FIG. 10, FIG. 10 illustrates a schematic flowchart of a point cloud decoding method provided in implementations of the present disclosure. As illustrated in FIG. 10, the method may include the following.

At S1001, occupancy bit information of neighbouring nodes of a current node is obtained.

It should be noted that in a point cloud, a point(s) may be all points or some points in the point cloud that are relatively concentrated in space. Here, the current node may also be referred to as a current point or a current block, specifically the point or block that is currently to be decoded in the point cloud.

It should also be noted that, based on the framework of the G-PCC decoder illustrated in FIG. 1B, the method in this disclosure is mainly applied to the "context modelling" part, which optimizes the geometry information entropy decoding that is based on the point cloud neighbouring nodes in the related art, in order to improve the exploitation of spatial correlation.

It is understood that the occupancy bit information of a neighbouring node is determined based on whether there is a point(s) occupying that neighbouring node. In some implementations, the occupancy bit information of the neighbouring nodes of the current node may be obtained as follows.

If the neighbouring node is occupied by a point(s), it is determined that the occupancy bit information of the neighbouring node is equal to a first value.

If the neighbouring node is not occupied by any point, it is determined that the occupancy bit information of the neighbouring node is equal to a second value.

In this disclosure, the neighbouring nodes include at least one of: a neighbouring node coplanar with the current node, a neighbouring node collinear with the current node, or a neighbouring node concurrent with the current node.

That is, at least one point may be obtained by partitioning the point cloud spatially. From the at least one point, the neighbouring nodes of the current node are determined according to a geometry position of the current node. Typically, the number of neighbouring nodes of the current node is 26 in total. The number of neighbouring nodes coplanar with the current node is 6, the number of neighbouring nodes collinear with the current node is 12, and the number of neighbouring nodes concurrent with the current node is 8.

In this disclosure, the first value may be 1 and the second value may be 0; or, the first value may be 0 and the second value may be 1. In one specific example, the first value may be set to 1 and the second value may be set to 0, but without specific limitation.

For example, the first value is 1 and the second value is 0. If a neighbouring node is occupied by a point, then the occupancy bit information of that neighbouring node is equal to 1. If a neighbouring node is not occupied by any point, then the occupancy bit information of that neighbouring node is equal to 0. Conversely, if the occupancy bit information of a neighbouring node is equal to 1, it indicates that a point(s) occupies the neighbouring node. If the occupancy bit information of a neighbouring node is equal to 0, it indicates that no point occupies the neighbouring node.

At S1002, a context model is determined according to the occupancy bit information of the neighbouring nodes.

At S1003, related information of the current node is obtained by parsing a bitstream with the context model.

In implementations of the present disclosure, the related information includes at least one of flag information of a single child node or coordinate information of the single child node. Accordingly, the context model may include a first context model and a second context model. The first context model is used for predicting the flag information of the single child node and the second context model is used for predicting the coordinate information of the single child node.

In one possible implementation, when the related information is the flag information of the single child node, in some implementations, the operations at S1002 of determining the context model according to the occupancy bit information of the neighbouring nodes may include the following.

Prediction flag information of the current node is determined according to the occupancy bit information of the neighbouring nodes. The first context model is determined according to the prediction flag information of the current node.

It is noted that, according to the prediction flag information of the current node, an index value of the first context model may be determined, and then according to the index value of the first context model, the first context model may be determined. Accordingly, in some implementations, the first context model may be determined according to the prediction flag information of the current node as follows.

The index value of the first context model is obtained according to the prediction flag information of the current node. The first context model is determined according to the index value of the first context model.

In a specific implementation, the method may further include constructing at least one first candidate context model, where different first candidate context models correspond to different index values.

Accordingly, the first context model may be determined according to the index value of the first context model as follows.

A first candidate context model corresponding to the index value is selected from the at least one first candidate context model according to the index value of the first context model, and the selected first candidate context model is determined as the first context model.

In other words, in the disclosure, at least one first candidate context model may be constructed in advance, and different flag information are output from different first candidate context models, and different first candidate context models correspond to different index values. In this way, different index values may be determined based on the different flag information. Thus, after the index value of the first context model is determined based on the prediction flag information of the current node, the first candidate context model corresponding to the index value may then be selected from the at least one first candidate context model and determined as the first context model.

It should be noted that the index value of the first context model may be signalled into the bitstream after determined at the encoder side. Thus the decoder may obtain the index value of the first context model directly by parsing the bitstream, and further determine the first context model. However, in this case, the bitrate may be increased and thus the coding efficiency is reduced.

Further, for S1003, in some implementations, the related information of the current node may be obtained by parsing the bitstream with the context model as follows.

Flag information of the single child node is obtained by parsing the bitstream with the first context model, where the flag information of the single child node indicates whether only one of child nodes partitioned from the current node is occupied It should be noted that after obtaining the value of the flag information (such as a flag), the number of occupied child nodes among child nodes partitioned from the current node may be determined. Specifically, in some implementations, the method may further include the following.

When the value of the flag information of the single child node is equal to a first flag value, it is determined that only one of the child nodes partitioned from the current node is occupied, and when the value of the flag information of the single child node is equal to a second flag value, it is determined that at least two of the child nodes partitioned from the current node are occupied.

In this disclosure, the first flag value may be 1 and the second flag value may be 0; or, the first flag value may be 0 and the second flag value may be 1. In one specific example, the first flag value may be set to 1 and the second flag value may be set to 0, but without specific limitation.

It should be noted that the value of the flag information may also be the number of occupied child nodes. For example, if the value of the flag information is equal to 0, then the current node has no occupied child node. If the value of the flag information is equal to 1, then the current node has only one occupied child. If the value of the flag information is greater than or equal to 2, then the current node has at least two occupied child nodes.

In another possible implementation, when the related information is the coordinate information of the single child node, for S1002, in some implementations, the context model may be determined according to the occupancy bit information of the neighbouring nodes as follows.

Prediction coordinate information of the current node is determined according to the occupancy bit information of the neighbouring nodes. The second context model is determined according to the prediction coordinate information of the current node.

It is noted that, according to the prediction coordinate information of the current node, an index value of the second context model may be determined, and then according to the index value of the second context model, the second context model may then be determined. Thus, in some implementations, the second context model may be determined according to the prediction coordinate information of the current node as follows.

The index value of the second context model is determined according to the prediction coordinate information of the current node. The second context model is determined according to the index value of the second context model.

In a specific implementation, the method may further include constructing at least one second candidate context model, where different second candidate context models correspond to different index values.

Accordingly, the second context model may be determined according to the index value of the second context model as follows.

According to the index value of the second context model, a second candidate context model corresponding to the index value is selected from the at least one second candidate context model, and the selected second candidate context model is determined as the second context model.

That is, in the present disclosure, at least one second candidate context model may be constructed in advance. Different second candidate context models output different coordinate information, while different second candidate context models correspond to different index values. In this way, different index values may be determined according to different flag information. In this way, after the index value of the second context model is determined according to the prediction coordinate information of the current node, the second candidate context model corresponding to the index value may then be selected from the at least one second candidate context model and determined as the second context model.

It should be noted that the index value of the second context model may be signalled into the bitstream after determined at the encoder side. Thus the decoder may obtain the index value of the second context model directly by parsing the bitstream, and further determine the second context model. However, in this case, the bitrate may also be increased and thus the coding efficiency is reduced.

Further, for S1003, in some implementations, the related information of the current node may be obtained by parsing the bitstream with the context model as follows.

When the flag information of the single child node indicates that only one of child nodes partitioned from the current node is occupied, coordinate information of the single child node is obtained by parsing the bitstream with the second context model.

It should be noted that when the value of the flag information indicates that only one of the child nodes partitioned from the current node is occupied, the coordinate information of the only occupied child node (which may be referred to as the "single child node") may be determined by parsing the bitstream. However, the entropy encoding method used for the coordinate information of the single child node may differ due to the neighbouring configuration number (NC), so that the entropy decoding method for the coordinate information of the single child node may differ. Therefore, the NC of the current node should be determined in this disclosure. In some implementations, the method may further include determining the NC of the current node.

In this way, according to the NC of the current node, whether the current node has an occupied neighbouring node can be determined, and then it is possible to further determine the entropy decoding method to be used for the coordinate information of the single child node, such as parsing the bitstream using the second context model, or parsing the bitstream using equal probability static binary arithmetic coding.

In some implementations, for S1003, the related information of the current node may be obtained by parsing the bitstream with the context model as follows.

The NC of the current node is determined. When the NC indicates that a neighbouring node of the current node is occupied, then when the flag information of the single child node indicates that only one of child nodes partitioned from the current node is occupied, obtaining the coordinate information of the single child node by parsing the bitstream with the second context model.

Further, in some implementations, the method may further include the following.

When the NC indicates that a neighbouring node of the current node is occupied, then when the flag information of the single child node indicates that only one of child nodes partitioned from the current block is occupied, the coordinate information of the single child node is obtained by parsing the bitstream with the equal probability static binary arithmetic coding.

In the implementations, the NC is used to indicate whether any of the neighbouring nodes coplanar with the current node is occupied. Specifically, in some implementations, the NC of the current node may be determined as follows.

Occupancy bit information of a neighbouring node coplanar with the current node is determined. The NC is determined according to the occupancy bit information of the neighbouring node coplanar with the current node.

Here, the neighbouring nodes coplanar with the current node may include at least one of: a neighbouring node adjacent to the left side of the current node, a neighbouring node adjacent to the right side of the current node, a neighbouring node adjacent to the upper side of the current node, a neighbouring node adjacent to the lower side of the current node, a neighbouring node adjacent to the rear side of the current node, or a neighbouring node adjacent to the front side of the current node. In other words, there are typically 6 neighbouring nodes that are coplanar with the current node, as illustrated in FIG. 2.

It is also to be noted that the occupancy bit information of the neighbouring node is determined based on the presence or absence of a point(s) in the neighbouring node. In a specific implementation, the occupancy bit information of the neighbouring node of the current node may be obtained as follows.

When a neighbouring node is occupied by a point, it is determined that occupancy bit information of the neighbouring node is equal to the first value. When the neighbouring node is not occupied by a point, it is determined that the occupancy bit information of the neighbouring node is equal to the second value.

In this disclosure, the first value may be 1 and the second value may be 0; or, the first value may be 0 and the second value may be 1. In one specific example, the first value may be set to 1 and the second value may be set to 0, but without specific limitation.

For example, the first value is 1 and the second value is 0. If a neighbouring node is occupied by a point, then the occupancy bit information of that neighbouring node is equal to 1. If a neighbouring node is not occupied by any point, then the occupancy bit information of that neighbouring node is equal to 0. Thus, based on the occupancy bit information of the 6 neighbouring nodes of the current node, the NC may be calculated.

Further, the NC may reflect whether the current node has a neighbouring node that is occupied. In some implementations, the method may further include the following.

When the NC is greater than 0, it is determined that a neighbouring node of the current node is occupied. When the NC is equal than 0, it is determined that no neighbouring node of the current node is occupied.

In this disclosure, the NC is in the range of 0 to 63, i.e., if the NC is greater than 0, it indicates that the current node has an occupied neighbouring node, and if the NC is equal to 0, it indicates that the current node has no occupied neighbouring node.

It can be understood that the implementations of the disclosure further introduce a new variable, that is, a single child node enabled variable (which may be denoted by ctxSingleChildEnabled). Accordingly, in some implementations, prior to S1002, the method may further include the following.

The value of the single child node enabled variable is determined.

Accordingly, for S1002, the context model may be determined according to the occupancy bit information of the neighbouring nodes as follows.

The context model is determined according to the occupancy bit information of the neighbouring nodes when the value of the single child node enabled variable indicates that the current node is in a single child node enabled state.

That is, when the value of the single child node enabled variable (i.e., ctxSingleChildEnabled) indicates that the current node is in the single child node enabled state, it is then necessary to determine the context model, such as the first context model and the second context model, so that the first context model and the second context model may be used to entropy decode the related information of the current node.

Here, the value of the single child node enabled variable is related to the number of nodes (denoted by $N_{all}$) and the number of single child nodes (denoted by $N_{singe}$). Specifically, in some implementations, the value of the single child node enabled variable may be determined as follows.

The number of nodes and the number of single child nodes are determined. A division operation is performed on the number of single child nodes and the number of nodes to obtain a first ratio. The first ratio is compared with a first threshold. The value of the single child node enabled variable is determined according to a comparison result between the first ratio and the first threshold.

In a specific implementation, the value of the single child node enabled variable may be determined according to the comparison result between the first ratio and the first threshold as follows.

When the first ratio is greater than the first threshold, the value of the single child node enabled variable is determined as a third value, and when the first ratio is less than or equal to the first threshold, the value of the single child node enabled variable is determined as a fourth value.

In this disclosure, the third value may be 1 and the fourth value may be 0; or, the third value may be 0 and the fourth value may be 1. In one specific example, the third value may be set to 1 and the fourth value may be set to 0, but without specific limitation.

It is to be noted that the first threshold may be used as a measure for determining the value of the single child node enabled variable. In the present disclosure, the first threshold may be a preset fixed value (e.g., obtained based on empirical values), a value determined by an adaptive algorithm, or even a value signalled by the encoder into the bitstream to allow the decoder to obtain the value by parsing the bitstream. Here, the first threshold is in a range [0, 1], which can be adjusted according to actual needs. In one specific example of the present disclosure, the first threshold may be set to 0.8, which is not specifically limited herein.

In this disclosure, the single child node enabled variable may be represented by ctxSingleChildEnabled. The single child node enabled variable may be determined according to formula (1) above.

Further, in some implementations, the method may further include the following.

If the value of the single child node enabled variable is 1, it is determined that the current node is in the single child node enabled state. If the value of the single child node enabled variable is 0, it is determined that the current node is in the single child node disabled state.

That is, if ctxSingleChildEnabled=1, then the current node is in the single child node enabled state, and in this case the point cloud decoding method described in the implementations of the present disclosure may be executed. If ctxSingleChildEnabled=0, then the current node is in the single child node disabled state, and in this case the point cloud decoding method in the related art may be executed, i.e., the occupancy bit information of the 8 child nodes of the current node may be obtained by decoding with NC context-based CABAC.

It is also to be noted that in the implementations of the present disclosure, $N_{singe}$ and $N_{all}$ are continuously updated. In some implementations, the method may further include the following.

The bitstream is parsed and for an i-th layer of an octree, an initial value of the number of nodes is set to be 0, an initial value of the number of single child nodes is set to be 0, and an initial value of the single child node enabled variable is set to be 0, i being an integer greater than or equal to 0 and less than K, K representing a number of layers of the octree and being an integer greater than 0.

Here, K represents the number of layers of the octree, and K is an integer greater than 0. For each layer of the octree, when starting to process the layer, the number of nodes, the number of single child nodes, and the value of the single child node enabled variable are initialized at first, i.e., the initial value of the number of nodes is assigned to 0, the initial value of the number of single child nodes is assigned to 0, and the initial value of the single child node enabled variable is assigned to 0.

Further, the number of nodes and the number of single child nodes may be determined as follows.

The bitstream is parsed and when it is determined that the current node is in the i-th layer of the octree, the number of nodes is obtained based on decoded nodes in the i-th layer. The number of single child nodes is obtained by determining, from the decoded nodes, a decoded node with only one occupied child node.

It is noted that both the number of nodes and the number of single child nodes refer to decoded nodes in the i-th layer. For the number of single child nodes, the number of single child nodes may be obtained by determining, from the decoded nodes, the decoded node with only one occupied child node as follows.

For each of the decoded nodes, determine whether only one of child nodes partitioned from the decoded node is occupied. Based on a determination that only one of the child nodes partitioned from the decoded node is occupied, the number of single child nodes is updated by incrementing the number of single child nodes by 1. Based on a determination that not only one of the child nodes partitioned from the decoded node is occupied, the number of single child nodes is maintained unchanged.

In other words, the bitstream is parsed and when proceed to the i-th layer of the octree, values of the number of nodes ($N_{all}$), the number of single child nodes ($N_{singe}$) and the single child node enabled variable (ctxSingleChildEnabled) are initialized, i.e. assigning $N_{all}$=0, $N_{singe}$=0, and ctxSingle-ChildEnabled=0. Then the bitstream is parsed and when it is determined that the current node (that is, the j-th node in the i-th layer) is in the i-th layer of the octree, for the i-th layer, after point cloud decoding has been performed on the j-th node in the i-th layer, update $N_{all}$=$N_{all}$+1, i.e., the number of nodes indicates the number of nodes that have been decoded. If child nodes partitioned from the j-th node includes only one occupied child node (i.e., $N_{oc}$=1), then update $N_{singe}$=$N_{singe}$+1, i.e., the number of single child nodes indicates the number of decoded nodes with only one occupied child node among the decoded nodes. When j is less than N, then update j=j+1, the operation of reading the j-th node in the i-th layer is continued until all nodes in the i-th layer have been processed, j being an integer greater than or equal to 0 and less than N, N being the total number of nodes in the i-th layer. Next, process the (i+1)-th layer of the octree until all K layers of the octree have been processed.

In this way, after determining $N_{singe}$ and $N_{all}$, the value of the single child node enabled variable (ctxSingleChildEnabled) may be calculated with formula (1), so as to determine whether the context model is required for subsequent entropy decoding.

Specifically, in this disclosure, if the NC indicates that the current node has an occupied neighbouring node, then NC>0, and if the value of the single child node enabled variable indicates that the current node is in the single child node enabled state, then ctxSingleChildEnabled=1. That is, when the NC indicates that the current node has an occupied neighbouring node (i.e., NC>0) and ctxSingleChildEnabled=1, the context model needs to be constructed. Additionally, in this disclosure, in the case that the child nodes of the neighbouring node are not used to construct the context model (adjacent_child_contextualization_enabled_flag==0), the occupancy bit information of the neighbouring nodes may be used to construct the context model, and then the coordinate information of the single child node may be decoded using the constructed context model, which may further improve the coding efficiency.

The following is a detailed description of the process of using the occupancy bit information of neighbouring nodes to construct the first context model and the second context model.

In some implementations, when the value of the single child node enabled variable indicates that the current node is in the single child node enabled state, for the first context model, the context model may be determined according to the occupancy bit information of the neighbouring nodes as follows.

The prediction flag information of the current node is determined based on the occupancy bit information of the neighbouring nodes. The first context model is determined based on the prediction flag information of the current node.

It is to be noted that the determination of the first context model is related to the prediction flag information of the current node, where the prediction flag information of the current node is determined according to the occupancy bit information of the neighbouring nodes. In a specific implementation, the prediction flag information of the current node may be determined according to the occupancy bit information of the neighbouring nodes as follows.

According to the occupancy bit information of the neighbouring nodes, a first number of nodes each occupied by a point is determined among neighbouring nodes coplanar with the current node. The prediction flag information of the current node is determined according to the first number of nodes In this disclosure, the first number of nodes may be represented by $N_{on}$ which indicates the number of occupied neighbouring nodes among the 6 neighbouring nodes coplanar with the current node. $N_{on}$ may take values from 0 to 6.

Further, after obtaining the first number of nodes, the first number may be used to determine the prediction flag information for the current node. In some implementations, the prediction flag information of the current node may be determined according to the first number of nodes as follows.

The first number of nodes is compared with a second threshold value. The prediction flag information of the current node is determined according to a comparison result between the first number of nodes and the second threshold value.

In a specific implementation, the prediction flag information of the current node is determined according to the comparison result between the first number of nodes and the second threshold as follows.

When the first number of nodes is less than the second threshold, the prediction flag information of the current node is determined as a fifth value. When the first number of nodes is greater than or equal to the second threshold, the prediction flag information of the current node is determined as a sixth value.

In this disclosure, the fifth value may be 1 and the sixth value may be 0; or, the fifth value may be 0 and the sixth value may be 1. In one specific example, the fifth value may be set to 1 and the sixth value may be set to 0, but without specific limitation.

Further, the second threshold may be used as a measure for determining the value of the prediction flag information of the current node. In the present disclosure, the second threshold may be a preset fixed value, a value determined using an adaptive algorithm, or even a value signalled by the encoder into the bitstream to allow the decoder to obtain the value by parsing the bitstream. Here, the second threshold is in a range of [0, 6], which can be adjusted according to actual needs. In one specific example of the present disclosure, the second threshold may be set to 3, which is not specifically limited.

In one specific implementation, by predicting the flag information (e.g., a flag) with $N_{on}$, two context models may be constructed as illustrated in formula (2) above.

As such, after obtaining $N_{on}$, the prediction value of the flag information may be determined according to $N_{on}$, and further the index value of the first context model may be determined. Then from the two first candidate context models illustrated in formula (2), the first candidate context model corresponding to the index value may be selected as the first context model.

In some implementations, when the value of the single child node enabled variable indicates that the current node is in the single child node enabled state, for the second context model, the context model may be determined according to the occupancy bit information of the neighbouring nodes as follows.

The prediction coordinate information of the current node is determined according to the occupancy bit information of the neighbouring nodes. The second context model is determined according to the prediction coordinate information of the current node.

It is to be noted that the determination of the second context model is related to the prediction coordinate information of the current node, where the prediction coordinate information is determined by the occupancy bit information of neighbouring nodes. In a specific implementation, the prediction coordinate information of the current node may be determined according to the occupancy bit information of the neighbouring nodes as follows.

According to the occupancy bit information of the neighbouring nodes, determine a second number of nodes each occupied by a point among neighbouring nodes in a first plane corresponding to a coordinate value in a first direction equal to a seventh value, a third number of nodes each occupied by a point among neighbouring nodes in a second plane corresponding to a coordinate value in a second direction equal to the seventh value, and a fourth number of nodes each occupied by a point among neighbouring nodes in a third plane corresponding to a coordinate value in a third direction equal to the seventh value. The second number of nodes is compared with a third threshold, and a first $1^{st}$ prediction value in the first coordinate direction is determined according to a comparison result. The third number of nodes is compared with the third threshold, and a second $1^{st}$ prediction value in a second coordinate direction is determined according to a comparison result. The fourth number of nodes is compared with the third threshold, and a third $1^{st}$ prediction value in a third coordinate direction is determined according to a comparison result. A first set of prediction coordinate information of the current node is obtained according to the first $1^{st}$ prediction value, the second $1^{st}$ prediction value, and the third $1^{st}$ prediction value.

Here, the seventh value may be −1, or the seventh value may be 1. In one specific example, the seventh value may be −1, which is not specifically limited.

In addition, the third threshold may be used as a measure for determining the value of the prediction coordinate information of the current node. In the present disclosure, the third threshold may be a preset fixed value, a value determined using an adaptive algorithm, or even a value signalled by the encoder into the bitstream to allow the decoder to obtain the value by parsing the bitstream. In implementations of the disclosure, the third threshold can be adjusted according to actual needs, which is not specifically limited herein. In one specific example, the third threshold may be set to 0.

It should also be noted that the second number of nodes may be represented by $N_{x=-1}$ which indicates the number of occupied nodes among 9 neighbouring nodes in the yz-plane with coordinate value −1 in the x-axis direction. $N_{x=-1}$ may take the value from 0 to 9. The third number of nodes may be represented by $N_{y=-1}$ which indicates the number of occupied nodes among 9 neighbouring nodes in the xz-plane with coordinate value −1 in the y-axis direction. $N_{y=-1}$ may take the value from 0 to 9. The fourth number of nodes may be represented by $N_{z=-1}$ which indicates the number of occupied nodes among 9 neighbouring nodes in the xy-plane with coordinate value −1 in the z-axis direction. $N_{z=-1}$ may take the value from 0 to 9.

Exemplarily, taking FIG. 6 as an example, assuming that the seventh value is equal to −1, $N_{x=-1}$ may be defined as the number of occupied nodes among the 9 neighbouring nodes in the yz-plane with coordinate value of −1 in the x-axis direction. The coordinate value in the x-axis direction of a single child node of the current node may be predicted through $N_{x=-1}$ (i.e., the first $1^{st}$ prediction value, denoted by $X_0$), from which 2 context models may be constructed, as illustrated in formula (3) above.

Assuming that the seventh value is equal to −1, $N_{y=-1}$ may be defined as the number of occupied nodes among the 9 neighbouring nodes in the xz-plane with coordinate value of −1 in the y-axis direction. The coordinate value in the y-axis direction of the single child node of the current node may be predicted through $N_{y=-1}$ (i.e., the second $1^{st}$ prediction value, denoted by $Y_0$), from which 2 context models may be constructed, as illustrated in formula (4) above.

Assuming that the seventh value is equal to −1, $N_{z=-1}$ may be defined as the number of occupied nodes among the 9 neighbouring nodes in the xy-plane with coordinate value of −1 in the z-axis direction. The coordinate value in the z-axis direction of the single child node of the current node may be predicted through $N_{z=-1}$ (i.e., the third $1^{st}$ prediction value, denoted by $Z_0$), from which 2 context models may be constructed, as illustrated in formula (5) above.

In another specific implementation, the prediction coordinate information of the current node may be determined according to the occupancy bit information of the neighbouring nodes as follows.

According to the occupancy bit information of the neighbouring node, determine a fifth number of nodes each occupied by a point among neighbouring nodes in a first plane corresponding to the coordinate value in the first direction equal to an eighth value, a sixth number of nodes each occupied by a point among neighbouring nodes in a second plane corresponding to the coordinate value in the second direction equal to the eighth value, and a seventh number of nodes occupied by a point among neighbouring nodes in a third plane corresponding to the coordinate value in the third direction equal to the eighth value. The fifth number of nodes is compared with a fourth threshold, and a first $2^{nd}$ prediction value in the first coordinate direction is determined according to a comparison result. The sixth number of nodes is compared with the fourth threshold, and a second $2^{nd}$ prediction value in the second coordinate direction is determined according to a comparison result. The seventh number of nodes is compared with the fourth threshold, and a third $2^{nd}$ prediction value in the third coordinate direction is determined according to a comparison result. A second set of prediction coordinate information of the current node is determined according to the first $2^{nd}$ prediction value, the second $2^{nd}$ prediction value, and the third $2^{nd}$ prediction value.

In implementations of the present disclosure, the seventh value may be −1 and the eighth value may be 1; or, the seventh value may be 1 and the eighth value may be −1. In one specific example, the seventh value may be −1 and the eighth value may be 1, but without specific limitation.

In addition, the fourth threshold may be used as a measure for determining the value of the prediction coordinate information of the current node. In this disclosure, the fourth threshold may a preset fixed value, a value determined using an adaptive algorithm, or even a value signalled by the encoder into the bitstream to allow the decoder to obtain the value by parsing the bitstream. In implementations of the present disclosure, the fourth threshold may be the same as or different from the third threshold, which may be adjusted according to the actual situation and is not specifically limited here. In one specific example, the fourth threshold may also be set to 0.

It should also be noted that the fifth number of nodes may be represented by $N_{x=1}$ which indicates the number of occupied nodes among 9 neighbouring nodes in the yz-plane with coordinate value 1 in the x-axis direction. $N_{x=1}$ may take the value from 0 to 9. The sixth number of nodes may be represented by $N_{y=1}$ which indicates the number of occupied nodes among 9 neighbouring nodes in the xz-plane with coordinate value 1 in the y-axis direction. $N_{y=1}$ may take the value from 0 to 9. The seventh number of nodes may be represented by $N_{z=1}$ which indicates the number of occupied nodes among 9 neighbouring nodes in the xy-plane with coordinate value 1 in the z-axis direction. $N_{z=1}$ may take the value from 0 to 9.

Still taking FIG. 6 as an example, assuming that the eighth value is equal to 1, $N_{x=1}$ may be defined as the number of occupied nodes among the 9 neighbouring nodes in the yz-plane with coordinate value of 1 in the x-axis direction. The coordinate value in the x-axis direction of a single child node of the current node may be predicted through $N_{x=1}$ (i.e., the first $2^{nd}$ prediction value, denoted by $X_1$), from which 2 context models may be constructed as illustrated in formula (6) above.

Assuming that the eighth value is equal to 1, $N_{y=1}$ may be defined as the number of occupied nodes among the 9 neighbouring nodes in the xz-plane with coordinate value of 1 in the y-axis direction. The coordinate value in the y-axis direction of the single child node of the current node may be predicted through $N_{y=1}$ (i.e., the second $2^{nd}$ prediction value, denoted by $Y_1$), from which 2 context models may be constructed as illustrated in formula (7) above.

Assuming that the eighth value is equal to 1, $N_{z=1}$ may be defined as the number of occupied nodes among the 9 neighbouring nodes in the xy-plane with coordinate value of 1 in the z-axis direction. The coordinate value in the z-axis direction of the single child node of the current node may be predicted through $N_{z=1}$ (i.e., the third $2^{nd}$ prediction value, denoted by $Z_1$), from which 2 context models may be constructed as illustrated in formula (8) above.

In this way, after the first set of prediction coordinate information of the current node is obtained and the second set of prediction coordinate information of the current node is obtained, according to these two sets of prediction coordinate information, the second context model may be determined. Specifically, in some implementations, the second context model may be determined according to the prediction coordinate information of the current node as follows.

The first set of prediction coordinate information and the second set of prediction coordinate information of the current node are obtained. An index value of the second context model is obtained according to the first set of prediction coordinate information and the second set of prediction coordinate information. The second context model is determined according to the index value of the second context model.

Further, the index value of the second context model may be obtained according to the first set of prediction coordinate information and the second set of prediction coordinate information as follows.

The first $1^{st}$ prediction value and the first $2^{nd}$ prediction value in the first coordinate direction, the second $1^{st}$ prediction value and the second $2^{nd}$ prediction value in the second coordinate direction, and the third $1^{st}$ prediction value and the third $2^{nd}$ prediction value in the third coordinate direction are obtained according to the first set of prediction coordinate information and the second set of prediction coordinate information. An index value of the second context model in the first coordinate direction is determined according to the first $1^{st}$ prediction value and the first $2^{nd}$ prediction value in the first coordinate direction. An index value of the second context model in the second coordinate direction is determined according to the second $1^{st}$ prediction value and the second $2^{nd}$ prediction value in the second coordinate direction. An index value of the second context model in the third coordinate direction is determined according to the third $1^{st}$ prediction value and the third $2^{nd}$ prediction value in the second coordinate direction.

That is, after obtaining the first $1^{st}$ prediction value and the first $2^{nd}$ prediction value in the first coordinate direction, the index value of the second context model in the first coordinate direction may be determined accordingly; after obtaining the second $1^{st}$ prediction value and the second $2^{nd}$ prediction value in the second coordinate direction, the index value of the second context model in the second coordinate direction may be determined accordingly; after obtaining the third $1^{st}$ prediction value and the third $2^{nd}$ prediction value in the third coordinate direction, the index value of the second context model in the third coordinate direction may be determined accordingly. Thus, the index value of the second context model is determined. A second candidate context model corresponding to the index value is then selected from the multiple second candidate context models as illustrated in formulas (3) to (8) as the second context model.

In this disclosure, the context model used to predict the flag information (flag) may include 2 context models. During the decoding process, the unique context index of the flag information is predicted according to the occupancy bit information of the neighbouring nodes of the current node, and one of the 2 context models is selected according to the index for subsequent CABAC of the flag information. The context models for predicting the coordinate information are constructed respectively for each of three coordinate directions (that is x/y/z coordinate directions), with 2×2=4 context models in each direction, so there are 12 context models in total in the three directions. During the encoding process, a unique context index is obtained based on the occupancy bits of the neighbouring nodes of the current node, and one of the 12 context models is selected based on the index for subsequent CABAC of the prediction coordinate values.

In addition, in another possible implementation, for the construction of the context model, as illustrated in FIG. 6, the occupancy bit information (occupancy bits) of the 26 neighbouring nodes of the current node is obtained, where the occupancy bit of a neighbouring node is 1 if the neighbouring node is occupied, otherwise the occupancy bit is 0. In this way, the NC may be calculated, which may range from 0 to $2^{26}$, i.e., from "26 zeros" to "26 ones" in binary. Thus, up to $2^{26}$ context models may be constructed according to the NC. Additionally, any n among the $2^{26}$ context models may be combined to obtain x context models, where x may take values from 1 to $2^{26}$.

In short, all the context models constructed above may be used to decode coordinate information and flag information. In a word, the occupancy bit information of the 26 neighbouring nodes of the current node may be used to construct the context model, and with the context model, the required flag information (flag) of the single child node of the current node may be decoded and the coordinate information of the occupied child node of the current node may be determined.

Further, in some implementations, after obtaining the coordinate information of the single child node, the method may further include the following.

Occupancy bit information of the child nodes partitioned from the current node is determined based on the coordinate information of the single child node.

It should be noted that the occupancy bit information of the child nodes partitioned from the current node can be determined based on the coordinate information of the occupied child node. In some implementations, after determining the occupancy bit information of the child nodes partitioned from the current node, the method may further include the following.

If the occupancy bit information of a child node is equal to the first value, it is determined that the child node is occupied by a point. If the occupancy bit information of the child node is equal to the second value, it is determined that the child node is occupied by no point.

It should also be noted that the occupancy bit information of the child nodes partitioned from the current node can be determined based on the coordinate information of the occupied child node. In some implementations, after determining the occupancy bit information of the child nodes partitioned from the current node, the method may further include determining the number of occupied child nodes ($N_{oc}$) according to the occupancy bit information of the child nodes.

In this disclosure, the first value may be 1 and the second value may be 0; or, the first value may be 0 and the second value may be 1. In one specific example, the first value may be set to 1 and the second value may be set to 0, but without specific limitation.

For example, the first value is 1 and the second value is 0. If the occupancy bit information of a child node is equal to 1, then the child node is occupied by a point. If the occupancy bit information of a child node is equal to 0, then the child node is not occupied by any point.

As such, after decoding the coordinate information of the occupied child node, the occupancy bit information of the child nodes partitioned from the current node can be restored.

The point cloud decoding method is provided in the implementations. The occupancy bit information of the neighbouring nodes of the current node is obtained. The context model is determined according to the occupancy bit information of the neighbouring nodes. The related information of the current node is obtained by parsing the bitstream with the context model, where the related information includes at least one of flag information of a single child node or coordinate information of the single child node. In this way, the context model is constructed using the occupancy bit information of the neighbouring nodes and then is used to entropy decode the flag information and coordinate information of the single child node, which can fully utilize the spatial correlation of the point cloud and thus the coding efficiency of the point cloud can be improved.

Figure 11:
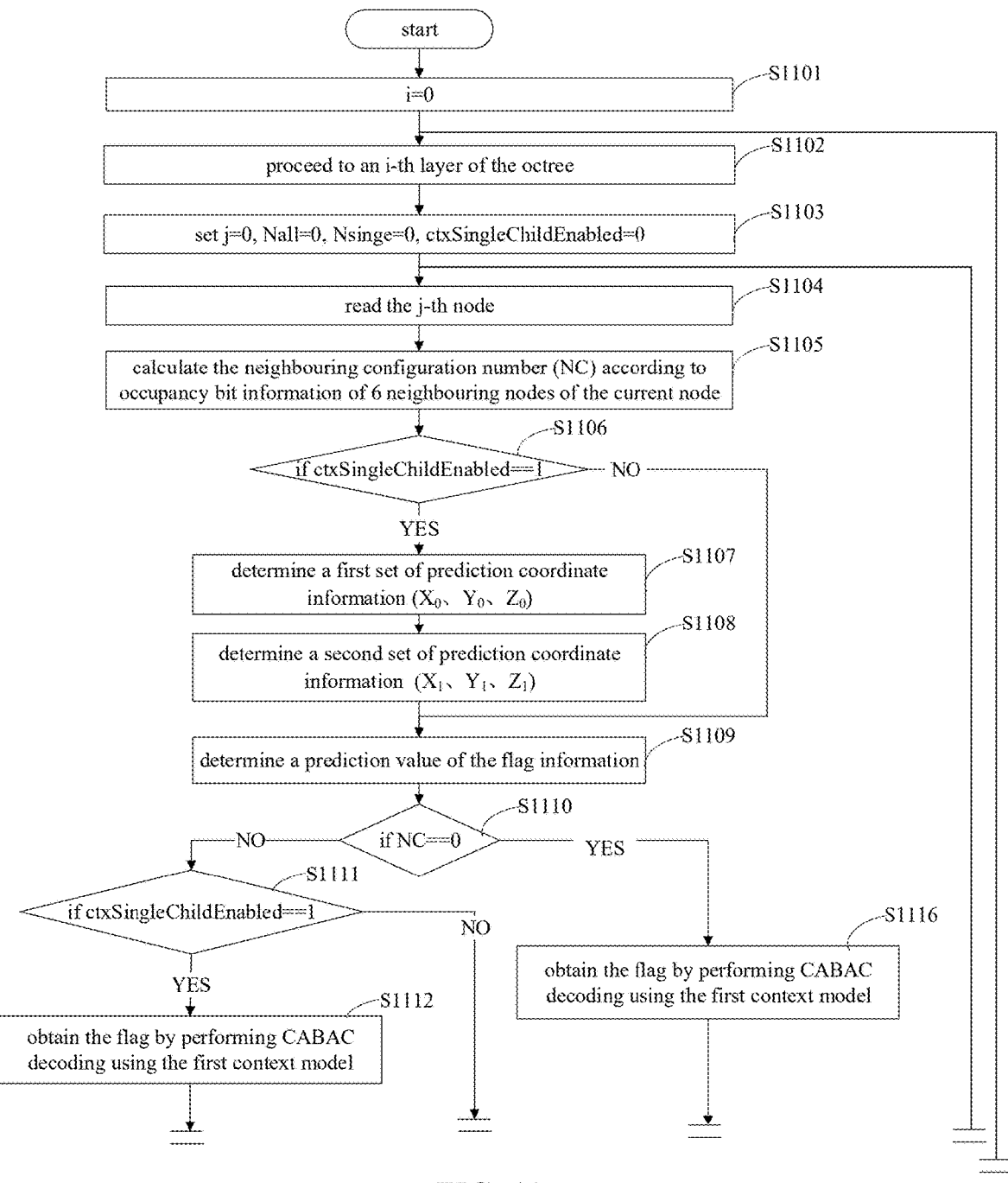
FIG. 11 is a schematic detailed flowchart of a point cloud decoding method provided in implementations of the present disclosure.
Figure 11:
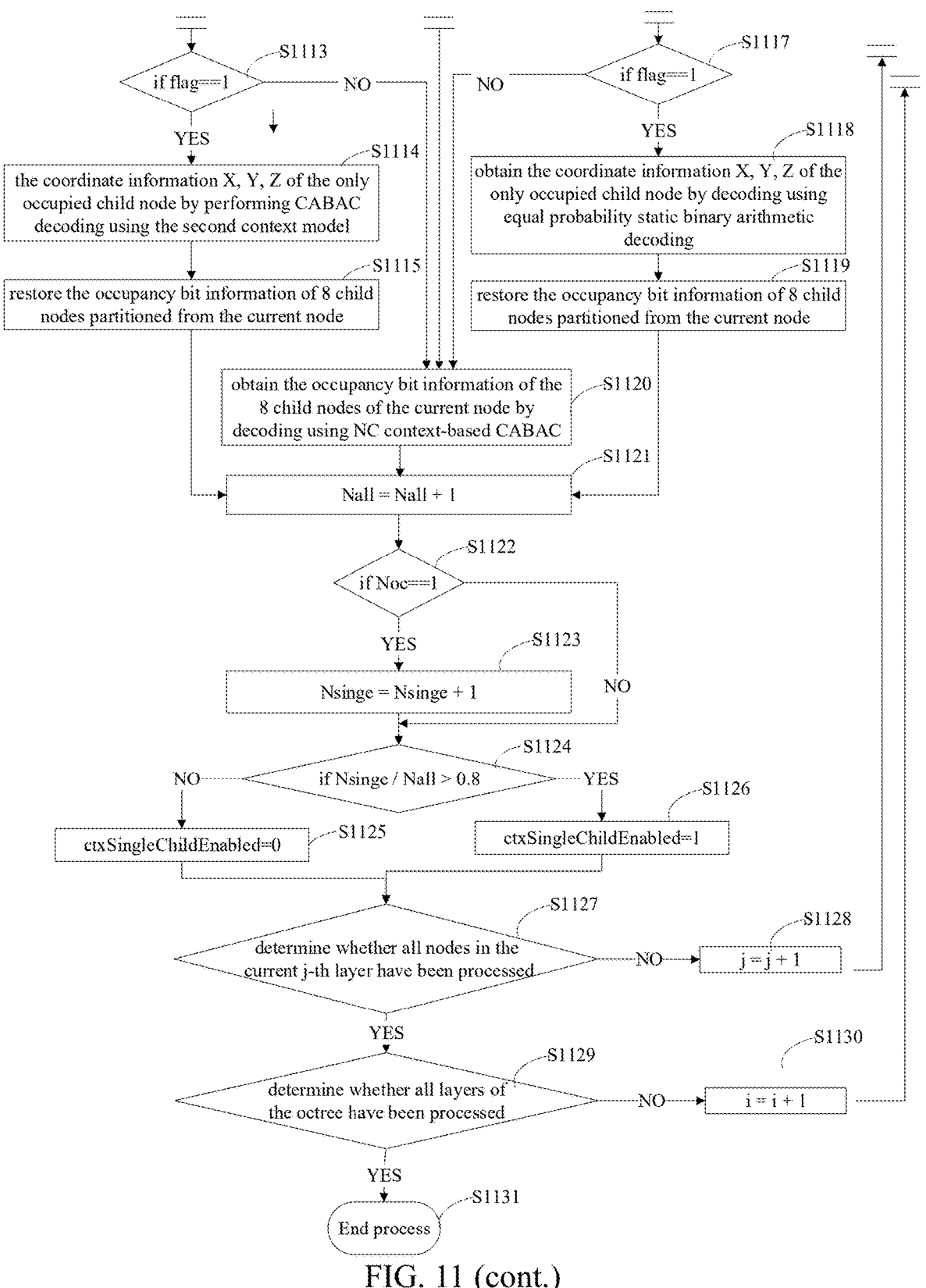

In another implementation of the present disclosure, referring to FIG. 11, FIG. 11 illustrates a schematic flowchart of a detailed process of a point cloud decoding method provided in implementations of the present disclosure. As illustrated in FIG. 11, the detailed process may include the following.

At S1101, i=0.

At S1102, proceed to an i-th layer of the octree.

Here, i is an integer greater than or equal to 0 and less than K. K denotes the number of layers into which the octree is partitioned. It should be noted that in this detailed process, proceed to the 0-th layer of the octree firstly.

At S1103, set j=0, $N_{all}$=0, $N_{singe}$=0, and ctxSingleChildEnabled=0.

At S1104, read the j-th node.

Here, j is an integer greater than or equal to 0 and less than N, and N is the total number of nodes in the i-th layer.

At S1105, calculate the neighbouring configuration number (NC) according to occupancy bit information of 6 neighbouring nodes of the current node.

At S1106, determine whether ctxSingleChildEnabled==1.

At S1107, determine a first set of prediction coordinate information ($X_0$, $Y_0$, $Z_0$).

At S1108, determine a second set of prediction coordinate information ($X_1$, $Y_1$, $Z_1$).

At S1109, determine a prediction value of the flag information.

It should be noted that if the determination result for S1106 is yes, then operations at S1107 to S1108 will be executed, and then operations at S1109 will be executed. If the determination result for S1106 is no, then operations at S1109 will be executed directly.

At S1110, determine whether NC==0.

At S1111, if the determination result is no, then determine whether ctxSingleChildEnabled==1.

At S1112, if the determination result is yes, then obtain the flag by performing CABAC decoding using the first context model.

At S1113, determine whether flag==1.

At S1114, if the determination result is yes, obtain the coordinate information X, Y, Z of the only occupied child node by performing CABAC decoding using the second context model.

At S1115, restore the occupancy bit information of 8 child nodes partitioned from the current node.

In the implementations of the disclosure, the first context model is used for predicting the flag information (such as the flag) and the second context model is used for predicting the coordinate information (such as XYZ coordinate values).

It should be noted that for operations at S1113, if the determination result is yes, operations at S1114 to S1115 are executed, and if the determination result is no, operations at S1120 are executed.

It should also be noted that for operations at S1110, if the determination result is no, operations at S1111 is executed, and if the determination result is no, operations at S1116 is executed.

At S1116, if the determination result is yes, obtain the flag by performing CABAC decoding using the first context model.

At S1117, determine whether flag==1.

At S1118, if the determination result is yes, obtain the coordinate information X, Y, Z of the only occupied child node by decoding using equal probability static binary arithmetic decoding.

At S1119, restore the occupancy bit information of 8 child nodes partitioned from the current node.

At S1120, if the determination result is no, obtain the occupancy bit information of the 8 child nodes of the current node by decoding using NC context-based CABAC.

At S1121, $N_{all}=N_{all}+1$.

It should be noted that for operations at S1111, S1113 or S1117, if the determination result is no, operations at S1120 will be executed. After operations at S1120, S1115 or S1119, operations at S1121 will be executed.

At S1122, determine whether $N_{oc}=1$.

At S1123, if the determination result is yes, then $N_{singe}=N_{singe}+1$.

At S1124, determine whether $N_{singe}/N_{all}>0.8$.

It should be noted that for operations at S1122, if the determination result is yes, operations at S1123 will be executed first and then operations at S1124 will be executed. if the determination result is no, operations at S1124 will be executed directly.

At S1125, if the determination result is no, then ctxSingleChildEnabled=0.

At S1126, if the determination result is yes, then ctxSingleChildEnabled=1.

At S1127, determine whether all nodes in the current i-th layer have been processed.

At S1128, if the determination result is no, then j=j+1 and return to S1104.

At S1129, if the determination result is yes, determine whether all layers of the octree have been processed.

At S1130, if the determination result is no, then i=i+1 and return to S1102.

At S1131, if the determination result is yes, the process is ended.

It is noted that the process first proceeds to the i-th layer of the octree (the minimum value of i is 0), and initializes the number of nodes $N_{all}=0$, the number of single child nodes $N_{singe}=0$ and, the single child node enabled variable ctxSingleChildEnabled=0.

Then, the j-th node (the minimum value of j is 0) is read and NC is calculated according to the occupancy bit information (or called occupancy bit pattern) of the 6 neighboring nodes of the current node.

Next, when ctxSingleChildEnabled==1, according to the occupancy bit information of the 6 neighbouring nodes adjacent to the current node, $N_{on}$ is calculated and finally flag is predicted. According to the occupancy bit information of the 6 neighbouring nodes of the current node, $N_{x=-1}$, $N_{y=-1}$, and $N_{z=-1}$ are calculated and the first set of coordinate information $X_0$, $Y_0$, and $Z_0$ are predicted, and $N_{x=1}$, $N_{y=1}$, and $N_{z=1}$ are calculated and the second set of coordinate information $X_1$, $Y_1$, and $Z_1$ are predicted. When ctxSingleChildEnabled==0, the flag may also be predicted according to the occupancy bit information of the 6 neighbouring nodes adjacent to the current node.

Next, when NC==0 (the neighbouring configuration number is 0, i.e. none of the 6 neighbouring nodes is occupied), since the prediction flag has been obtained, the flag may be obtained using adaptive binary arithmetic decoding based on the context "prediction flag". When the flag is equal to 1, the coordinate information of the single child node (X/Y/Z coordinate values) in the current node are obtained using equal probability static binary arithmetic decoding, and the occupancy bit information of the 8 child nodes are restored.

When NC>0 (the 6 neighbouring nodes have an occupied neighbouring node) and ctxSingleChildEnabled==1, the flag is obtained using adaptive binary arithmetic decoding based on the context "prediction flag". When the flag==1, the coordinate information of the single child node (X/Y/Z coordinate values) in the current node are obtained using adaptive binary arithmetic decoding based on the context "prediction coordinate information", and the occupancy bit information of the 8 child nodes are restored.

When flag==0 (more than 1 of the 8 child nodes are occupied), or NC>0 (the 6 neighbouring nodes have an occupied neighbouring node) and ctxSingleChildEnabled==0, then the occupancy bit information of the 8 child nodes of the current node is decoded using CABAC.

Finally, update $N_{all}=N_{all}+1$. $N_{oc}$ is calculated according to the occupancy bit information of the 8 child nodes. When $N_{oc}=1$, update $N_{singe}=N_{singe}+1$. The ctxSingleChildEnabled is specifically calculated as illustrated in formula (9) above.

If all nodes in the current i-th layer have been processed, then i=i+1, and return to S1102 to process the next layer of the octree. Otherwise, j=j+1, and return to S1104 to process the next node in the i-th layer. If all layers have been processed, then the process may be ended.

In short, the protection point of this disclosure is the construction of the context model of "prediction flag" and "prediction coordinate information" for decoding of the single child node, which improves the compression efficiency through CABAC. Additionally, enablement of the point cloud decoding method is controlled through a proportion of nodes with the single child node in all nodes.

The present implementations provide the point cloud decoding method, and the specific implementations is elaborated through the aforementioned description, from which it may be seen that since the context models are constructed separately for the flag information and coordinate information of the single child node, the entropy decoding of the flag information and coordinate information based on the constructed context model can make full use of the spatial correlation of the point cloud, and thus can improve the coding efficiency of the point cloud.

Figure 12:
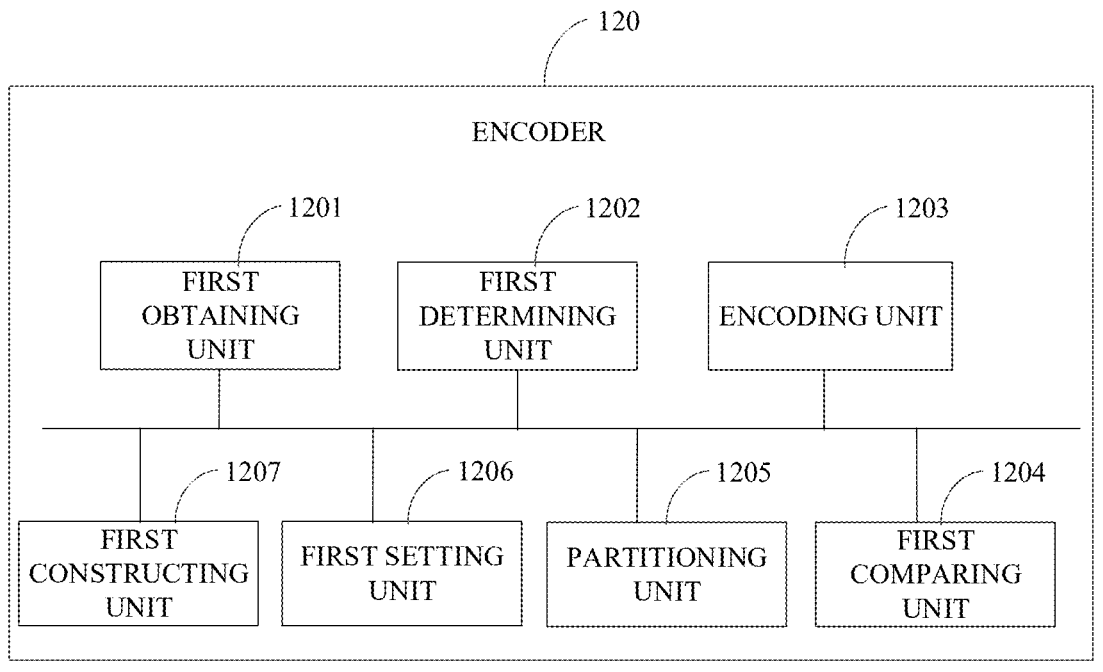
FIG. 12 is a schematic structural diagram of an encoder provided in implementations of the present disclosure.

In another implementation of the present disclosure, based on the same idea as the above implementations, referring to FIG. 12, FIG. 12 is a schematic block diagram of an encoder 120 provided in implementations of the disclosure. As illustrated in FIG. 12, the encoder 120 may include a first obtaining unit 1201, a first determining unit 1202, and an encoding unit 1203.

The first obtaining unit 1201 is configured to obtain occupancy bit information of neighbouring nodes of a current node.

The first determining unit 1202 is configured to determine a context model according to the occupancy bit information of the neighbouring nodes.

The encoding unit 1203 is configured to entropy encode related information of the current node with the context model and signal into a bitstream, where the related information includes at least one of flag information of a single child node or coordinate information of the single child node.

In some implementations, the first determining unit 1202 is specifically configured to determine prediction flag information of the current node according to the occupancy bit information of the neighbouring nodes, and determine a first context model according to the prediction flag information of the current node.

In some implementations, the first determining unit 1202 is further configured to determine a number of occupied child nodes of the current node, and determine the flag information of the single child node according to the number of occupied child nodes.

The encoding unit 1203 is specifically configured to entropy encode the flag information of the single child node with the first context model and signal into the bitstream.

In some implementations, the first determining unit 1202 is specifically configured to determine prediction coordinate information of the current node according to the occupancy bit information of the neighbouring nodes, and determine a second context model according to the prediction coordinate information of the current node.

In some implementations, the encoding unit 1203 is specifically configured to: when the flag information of the single child node indicates that only one of child nodes partitioned from the current node is occupied, determine the coordinate information of the single child node, entropy encode the coordinate information of the single child node with the second context model and signal into the bitstream.

In some implementations, the first determining unit 1202 is further configured to determine a neighbouring configuration number (NC) of the current node.

The encoding unit 1203 is further configured to: when the NC indicates that a neighbouring node of the current node is occupied, then when the flag information of the single child node indicates that only one of child nodes partitioned from the current node is occupied, determine the coordinate information of the single child node, entropy encode the coordinate information of the single child node with the second context model and signal into the bitstream.

In some implementations, the first determining unit 1202 is further configured to obtain occupancy bit information of the child nodes partitioned from the current node, and calculate the coordinate information of the single child node according to the occupancy bit information of the child nodes.

In some implementations, the neighbouring nodes include at least one of: a neighbouring node coplanar with the current node, a neighbouring node collinear with the current node, or a neighbouring node concurrent with the current node.

In some implementations, the first determining unit 1202 is further configured to: when a neighbouring node is occupied by a point, determine that occupancy bit information of the neighbouring node is equal to a first value, and when the neighbouring node is not occupied by a point, determine that the occupancy bit information of the neighbouring node is equal to a second value.

In some implementations, the first determining unit 1202 is further configured to determine occupancy bit information of a neighbouring node coplanar with the current node, and determine the NC according to the occupancy bit information of the neighbouring node coplanar with the current node.

In some implementations, the first determining unit 1202 is further configured to: when the NC is greater than 0, determine that a neighbouring node of the current node is occupied, and when the NC is equal than 0, determine that no neighbouring node of the current node is occupied.

In some implementations, the first determining unit 1202 is further configured to obtain occupancy bit information of child nodes partitioned from the current node, and determine the number of occupied child nodes according to the occupancy bit information of the child nodes.

In some implementations, the first determining unit 1202 is further configured to: when a child node is occupied by a point, determine that occupancy bit information of the child node is equal to a first value; and when the child node is not occupied by a point, determine that the occupancy bit information of the child node is equal to a second value.

In some implementations, the first value is 1 and the second value is 0; or the first value is 0 and the second value is 1.

In some implementations, the first determining unit 1202 is further configured to: when the number of occupied child nodes is equal to 1, determine a value of the flag information of the single child node as a first flag value; and when the number of occupied child nodes is unequal to 1, determine the value of the flag information of the single child node as a second flag value.

In some implementations, the first determining unit 1202 is further configured to: when the number of occupied child nodes is equal to 1, determine that only one of child nodes partitioned from the current node is occupied; and when the number of occupied child nodes is unequal to 1, determine that at least two of the child nodes partitioned from the current node are occupied.

In some implementations, the first determining unit 1202 is further configured to: when only one of the child nodes partitioned from the current node is occupied, determine a value of the flag information of the single child node as a first flag value; and when at least two of the child nodes partitioned from the current node are occupied, determine the value of the flag information of the single child node as a second flag value.

In some implementations, the first flag value is 1 and the second flag value is 0; or the first flag value is 0 and the second flag value is 1.

In some implementations, the first determining unit 1202 is further configured to determine a value of a single child node enabled variable, and determine the context model according to the occupancy bit information of the neighbouring nodes, when the value of the single child node enabled variable indicates that the current node is in a single child enabled state.

In some implementations, referring to FIG. 12, the encoder 120 may further include a first comparing unit 1204.

The first determining unit 1202 is further configured to determine a number of nodes and a number of single child nodes.

The first comparing unit 1204 is configured to perform a division operation on the number of single child nodes and the number of nodes to obtain a first ratio, compare the first ratio with a first threshold; and determine the value of the single child node enabled variable according to a comparison result between the first ratio and the first threshold.

Further, the first comparing unit 1204 is specifically configured to: when the first ratio is greater than the first threshold, determining the value of the single child node enabled variable as a third value; and when the first ratio is less than or equal to the first threshold, determining the value of the single child node enabled variable as a fourth value.

In some implementations, the third value is 1 and the fourth value is 0; or the third value is 0 and the fourth value is 1.

In some implementations, referring to FIG. 12, the encoder 120 may further include a partitioning unit 1205 and a first setting unit 1206.

The partitioning unit 1205 is configured to perform octree partitioning on an input point cloud to obtain an octree of K layers, K being an integer greater than 0.

The first setting unit 1206 is configured to, for an i-th layer of the octree, set an initial value of the number of nodes to be 0, set an initial value of the number of single child nodes to be 0, and set an initial value of the single child node enabled variable to be 0, i being an integer greater than or equal to 0 and less than K.

In some implementations, the first obtaining unit 1201 is further configured to, when the current node is in the i-th layer, obtain the number of nodes based on encoded nodes in the i-th layer; and obtain the number of single child nodes by determining, from the encoded nodes, an encoded node with only one occupied child node.

In some implementations, the first determining unit 1202 is further configured to, for each of the encoded nodes, determine whether only one of child nodes partitioned from the encoded node is occupied, based on a determination that only one of the child nodes partitioned from the encoded node is occupied, update the number of single child nodes by incrementing the number of single child nodes by 1; and based on a determination that not only one of the child nodes partitioned from the encoded node is occupied, maintain the number of single child nodes unchanged.

In some implementations, the first determining unit 1202 is further configured to determine, according to the occupancy bit information of the neighbouring nodes, a first number of nodes each occupied by a point among neighbouring nodes coplanar with the current node; and determine the prediction flag information of the current node according to the first number of nodes.

In some implementations, the first comparing unit 1204 is further configured to compare the first number of nodes with a second threshold; and determine the prediction flag information of the current node according to a comparison result between the first number of nodes and the second threshold.

Further, the first comparing unit 1204 is specifically configured to: when the first number of nodes is less than the second threshold, determine that the prediction flag information of the current node is equal to a fifth value; and when the first number of nodes is greater than or equal to the second threshold, determine that the prediction flag information of the current node is equal to a sixth value.

In some implementations, the fifth value is 1 and the sixth value is 0; or the fifth value is 0 and the sixth value is 1.

In some implementations, the first determining unit 1202 is specifically configured to obtain an index value of the first context model according to the prediction flag information of the current node; and determine the first context model according to the index value of the first context model.

In some implementations, referring to FIG. 12, the encoder 120 may further include a first constructing unit 1207, which is configured to construct at least one first candidate context model each corresponding to a different index value.

Correspondingly, the first determining unit 1202 is specifically configured to select a first candidate context model corresponding to the index value among the at least one first candidate context model according to the index value of the first context model, and determine the selected first candidate context model as the first context model.

In some implementations, the first determining unit 1202 is further configured to determine, according to the occupancy bit information of the neighbouring nodes, a second number of nodes each occupied by a point among neighbouring nodes in a first plane corresponding to a coordinate value in a first direction equal to a seventh value, a third number of nodes each occupied by a point among neighbouring nodes in a second plane corresponding to a coordinate value in a second direction equal to the seventh value, and a fourth number of nodes each occupied by a point among neighbouring nodes in a third plane corresponding to a coordinate value in a third direction equal to the seventh value.

The first comparing unit 1204 is further configured to compare the second number of nodes with a third threshold and determine a first $1^{st}$ prediction value in a first coordinate direction according to a comparison result; compare the third number of nodes with the third threshold and determine a second $1^{st}$ prediction value in a second coordinate direction according to a comparison result; compare the fourth number of nodes with the third threshold and determine a third $1^{st}$ prediction value in a third coordinate direction according to a comparison result; and obtain a first set of prediction coordinate information of the current node according to the first $1^{st}$ prediction value, the second $1^{st}$ prediction value, and the third $1^{st}$ prediction value.

In some implementations, the first determining unit 1202 is further configured to determine, according to the occupancy bit information of the neighbouring node, a fifth number of nodes each occupied by a point among neighbouring nodes in a first plane corresponding to the coordinate value in the first direction equal to an eighth value, a sixth number of nodes each occupied by a point among neighbouring nodes in a second plane corresponding to the coordinate value in the second direction equal to the eighth value, and a seventh number of nodes occupied by a point among neighbouring nodes in a third plane corresponding to the coordinate value in the third direction equal to the eighth value.

The first comparing unit 1204 is further configured to compare the fifth number of nodes with a fourth threshold and determine a first $2^{nd}$ prediction value in the first coordinate direction according to a comparison result; compare the sixth number of nodes with the fourth threshold and determine a second $2^{nd}$ prediction value in the second coordinate direction according to a comparison result; compare the seventh number of nodes with the fourth threshold and determine a third $2^{nd}$ prediction value in the third coordinate direction according to a comparison result; and obtain a second set of prediction coordinate information of the current node according to the first $2^{nd}$ prediction value, the second $2^{nd}$ prediction value, and the third 2nd prediction value.

In some implementations, the seventh value is −1 and the eighth value is 1; or the seventh value is 1 and the eighth value is −1.

In some implementations, the first obtaining unit 1201 is further configured to obtain the first set of prediction coordinate information and the second set of prediction coordinate information of the current node; and obtain an index value of the second context model according to the first set of prediction coordinate information and the second set of prediction coordinate information.

The first determining unit 1202 is further configured to determine the second context model according to the index value of the second context model.

In some implementations, the first constructing unit 1207 is further configured to construct at least one second candidate context model each corresponding to a different index value.

Correspondingly, the first determining unit 1202 is specifically configured to select a second candidate context model corresponding to the index value from the at least one second candidate context model according to the index value of the second context model, and determine the selected second candidate context model as the second context model.

In some implementations, the first obtaining unit 1201 is further configured to obtain the first $1^{st}$ prediction value and the first $2^{nd}$ prediction value in the first coordinate direction, the second $1^{st}$ prediction value and the second $2^{nd}$ prediction value in the second coordinate direction, and the third $1^{st}$ prediction value and the third $2^{nd}$ prediction value in the third coordinate direction according to the first set of prediction coordinate information and the second set of prediction coordinate information.

The first determining unit 1202 is further configured to determine an index value of the second context model in the first coordinate direction according to the first $1^{st}$ prediction value and the first $2^{nd}$ prediction value in the first coordinate direction; determine an index value of the second context model in the second coordinate direction according to the second $1^{st}$ prediction value and the second $2^{nd}$ prediction value in the second coordinate direction; and determine an index value of the second context model in the third coordinate direction according to the third $1^{st}$ prediction value and the third $2^{nd}$ prediction value in the second coordinate direction.

It will be understood that in this disclosure the "unit" may be part of the circuitry, part of the processor, part of the program or software, etc., and may be a module, or may be non-modular. Furthermore, the components in the implementations may be integrated in a single processing unit, or each unit may be physically separate, or two or more units may be integrated in a single unit. The above integrated units may be implemented either in the form of hardware or in the form of software function modules.

It is understood that if the integrated unit is implemented as a software function module and not sold or used as a stand-alone product, the integrated unit may be stored in a computer-readable storage medium. Based on such understanding, the technical solutions of the present disclosure in essential, or a part that contributes to the prior art, or all or part of the technical solutions, may be embodied in the form of a software product. The software product is stored in a storage medium and includes a number of instructions to enable a computer device (which may be a personal computer, a server, or a network device, etc.) or processor to perform all or part of the operations of the method described in this disclosure. The aforementioned storage medium includes a USB stick, a removable hard disk, a read only memory (ROM), a random access memory (RAM), a diskette or a CD-ROM, and other media that may store program codes.

Thus, implementations of the present disclosure provide a computer storage medium, which is applied to the encoder 120 and stores a computer program, the computer program implementing the method described in any of the preceding implementations when executed by the first processor.

Figure 13:
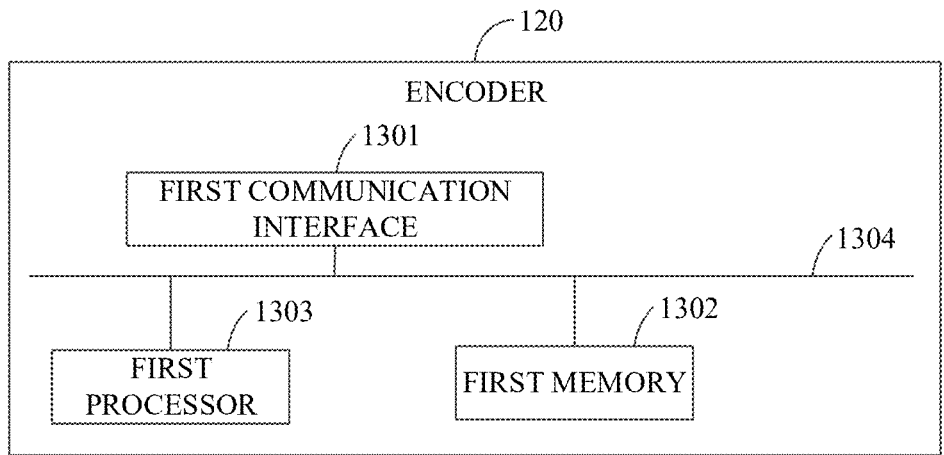
FIG. 13 is a schematic diagram of a specific hardware structure of an encoder provided in implementations of the present disclosure.

Based on the above structure of the encoder 120 and the computer storage medium, referring to FIG. 13, FIG. 13 illustrates a schematic diagram of the specific hardware structure of the encoder 120 provided in implementations of the present disclosure. As illustrated in FIG. 13, the encoder 120 may include a first communication interface 1301, a first memory 1302 and a first processor 1303. The components are coupled together via a first bus system 1304. It may be understood that the first bus system 1304 is configured to enable connection and communication between these components. The first bus system 1304 includes a power bus, a control bus, and a status signal bus in addition to a data bus. For the sake of clarity, however, the various buses are labelled as first bus system 1304 in FIG. 13.

The first communication interface 1301 is configured to receive and transmit signals during information transmission with other external network elements.

The first memory 1302 is configured to store a computer program capable of running on the first processor 1303.

The first processor 1303 is configured to, when executing the computer program, obtain occupancy bit information of neighbouring nodes of a current node, determine a context model according to the occupancy bit information of the neighbouring nodes, and entropy encode related information of the current node with the context model and signal into a bitstream, where the related information includes at least one of flag information of a single child node or coordinate information of the single child node.

It will be appreciated that the first memory 1302 in this disclosure may be a transitory memory or non-transitory memory, or may include both transitory and non-transitory memory. In particular, the non-transitory memory may be read-only memory (ROM), programmable ROM (PROM), erasable programmable read-only memory (EPROM), electrically erasable programmable read-only memory (EPROM), electrically EPROM (EEPROM) or flash memory. The transitory memory may be random access memory (RAM), which is used as an external cache. By way of illustration, but not limitation, many forms of RAM are available, such as static RAM (SRAM), dynamic RAM (DRAM), synchronous DRAM (SDRAM), double data rate synchronous random access memory (DDRSDRAM), enhanced SDRAM (ESDRAM), synchlink DRAM (SL-DRAM) and direct Rambus RAM (DRRAM). The first memory 1302 of the system and method described in this disclosure is intended to include, but is not limited to, these and any other suitable types of memory.

The first processor 1303 may be an integrated circuit chip with signal processing capabilities. In implementation, the operations in the above method may be accomplished by integrated logic circuitry in the hardware of the first processor 1303 or by instructions in the form of software. The first processor 1303 described above may be a general purpose processor, a digital signal processor (DSP), an application specific integrated circuit (ASIC), an off-the-shelf programmable gate array (FPGA), a field programmable gate array (FPGA) or other programmable logic device, discrete gate or transistor logic device, discrete hardware component. The various methods, steps and logic block diagrams of the disclosure in implementations of this disclosure may be implemented or performed. The general purpose processor may be a microprocessor or the processor may also be any conventional processor, etc. The operations in the method disclosed in conjunction with the implementations of the present disclosure may be performed directly by the hardware decoder processor or by a combination of hardware and software modules in the decoder processor. The software module may be located in a random memory, flash memory, read-only memory, programmable read-only memory or electrically erasable programmable memory, registers and other storage media well established in the art. The storage medium is located in the first memory 1302 and the first processor 1303 reads the information in the first memory 1302 and completes the operations of the above method in combination with its hardware.

It will be appreciated that these implementations described in this disclosure may be implemented in hardware, software, firmware, middleware, microcode, or combinations thereof. For hardware implementations, the processing unit may be implemented in one or more ASIC, DSP, DSP Device, programmable logic device (PLD), FPGA, general purpose processor, controller, microcontroller, microprocessor, other electronic unit for performing the functions described in this disclosure, or a combination thereof. For software implementations, the technology described in this disclosure may be implemented by means of modules (e.g. procedures, functions, etc.) that perform the functions described in this disclosure. The software code may be stored in a memory and executed by a processor. The memory may be implemented in the processor or outside the processor.

Optionally, as a further implementation, the first processor 1303 is further configured to perform the method described in any of the preceding implementations when running the computer program.

This disclosure provides the encoder which may include the first obtaining unit, the first determining unit and the encoding unit. Thus, in this way, since the occupancy bit information of neighbouring nodes is used to construct the context model, so that entropy decoding of flag information and coordinate information of the single child node is performed based on the constructed context model, the spatial correlation of the point cloud may be fully utilized, and thus the decoding efficiency of the point cloud may be improved.

Figure 14:
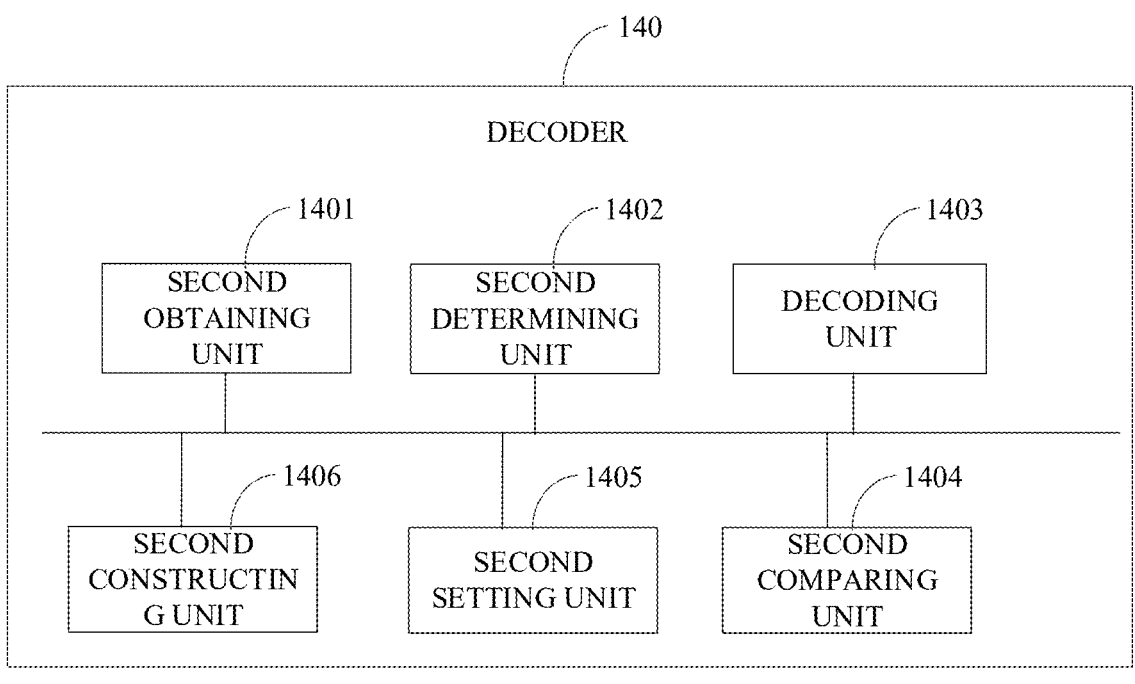
FIG. 14 is a schematic structural diagram of a decoder provided in implementations of the present disclosure.

In another implementation of the disclosure, based on the same idea as the implementations above, referring to FIG. 14, FIG. 14 is a schematic block diagram of a decoder 140 provided in implementations of the disclosure. As illustrated in FIG. 14, the decoder 140 may include a second obtaining unit 1401, a second determining unit 1402, and a decoding unit 1403.

The second obtaining unit 1401 is configured to obtain occupancy bit information of neighbouring nodes of a current node.

The second determining unit 1402 is configured to determine a context model according to the occupancy bit information of the neighbouring nodes.

The decoding unit 1403 is configured to obtain related information of the current node by parsing a bitstream with the context model, where the related information includes at least one of flag information of a single child node or coordinate information of the single child node.

In some implementations, the second determining unit 1402 is specifically configured to determine prediction flag information of the current node according to the occupancy bit information of the neighbouring nodes; and determine a first context model according to the prediction flag information of the current node.

In some implementations, the decoding unit 1403 is specifically configured to obtain flag information of the single child node by parsing the bitstream with the first context model, where the flag information of the single child node indicates whether only one of child nodes partitioned from the current node is occupied.

In some implementations, the second determining unit 1402 is specifically configured to when a value of the flag information of the single child node is equal to a first flag value, determine that only one of the child nodes partitioned from the current node is occupied; and when the value of the flag information of the single child node is equal to a second flag value, determine that at least two of the child nodes partitioned from the current node are occupied.

In some implementations, the first flag value is 1 and the second flag value is 0; or the first flag value is 0 and the second flag value is 1.

In some implementations, the second determining unit 1402 is specifically configured to determine prediction coordinate information of the current node according to the occupancy bit information of the neighbouring nodes; and determine a second context model according to the prediction coordinate information of the current node.

In some implementations, the decoding unit 1403 is specifically configured to, when the flag information of the single child node indicates that only one of child nodes partitioned from the current node is occupied, obtain coordinate information of the single child node by parsing the bitstream with the second context model.

In some implementations, the second determining unit 1402 is further configured to determine a neighbouring configuration number (NC) of the current node.

The decoding unit 1403 is specifically configured to, when the NC indicates that a neighbouring node of the current node is occupied, then when the flag information of the single child node indicates that only one of child nodes partitioned from the current node is occupied, obtain the coordinate information of the single child node by parsing the bitstream with the second context model.

In some implementations, the second determining unit 1402 is further configured to determine occupancy bit information of the child nodes partitioned from the current node based on the coordinate information of the single child node.

In some implementations, the neighbouring nodes include at least one of: a neighbouring node coplanar with the current node, a neighbouring node collinear with the current node, or a neighbouring node concurrent with the current node.

In some implementations, the second determining unit 1402 is further configured to, when a neighbouring node is occupied by a point, determine that occupancy bit information of the neighbouring node is equal to a first value; and when the neighbouring node is not occupied by a point, determine that the occupancy bit information of the neighbouring node is equal to a second value.

In some implementations, the first value is 1 and the second value is 0; or the first value is 0 and the second value is 1.

In some implementations, the second determining unit 1402 is further configured to obtain occupancy bit information of a neighbouring node coplanar with the current node; and determine the NC according to the occupancy bit information of the neighbouring node coplanar with the current node.

In some implementations, the second determining unit 1402 is further configured to, when the NC is greater than 0, determine that a neighbouring node of the current node is occupied; and when the NC is equal than 0, determine that no neighbouring node of the current node is occupied.

In some implementations, the second determining unit 1402 is further configured to determine a value of a single child node enabled variable, and determine the context model according to the occupancy bit information of the neighbouring nodes, when the value of the single child node enabled variable indicates that the current node is in a single child enabled state.

In some implementations, referring to FIG. 14, the decoder 140 may further include a second comparing unit 1404.

The second determining unit 1402 is further configured to determine a number of nodes and a number of single child nodes.

The second comparing unit 1404 is configured to perform a division operation on the number of single child nodes and the number of nodes to obtain a first ratio; compare the first ratio with a first threshold; and determine the value of the single child node enabled variable according to a comparison result between the first ratio and the first threshold.

Further, the second comparing unit 1404 is specifically configured to, when the first ratio is greater than the first threshold, determine the value of the single child node enabled variable as a third value; and when the first ratio is less than or equal to the first threshold, determine the value of the single child node enabled variable as a fourth value.

In some implementations, the third value is 1 and the fourth value is 0; or the third value is 0 and the fourth value is 1.

In some implementations, referring to FIG. 14, the decoder 140 may further include a second setting unit 1405. The bitstream is parsed by the decoding unit 1403 and the second setting unit 1405 is configured to, for an i-th layer of an octree, set an initial value of the number of nodes to be 0, set an initial value of the number of single child nodes to be 0, and set an initial value of the single child node enabled variable to be 0, i being an integer greater than or equal to 0 and less than K, K representing a number of layers of the octree and being an integer greater than 0.

In some implementations, the second obtaining unit 1401 is further configured to parse the bitstream through the decoding unit 1403 and obtain the number of nodes based on decoded nodes in the i-th layer when determining that the current node is in the i-th layer of the octree; and obtain the number of single child nodes by determining, from the decoded nodes, a decoded node with only one occupied child node.

In some implementations, the second obtaining unit 1401 is further configured to for each of the decoded nodes, determine whether only one of child nodes partitioned from the current node is occupied; based on a determination that only one of the child nodes partitioned from the decoded node is occupied, update the number of single child nodes by incrementing the number of single child nodes by 1; and based on a determination that not only one of the child nodes partitioned from the decoded node is occupied, maintain the number of single child nodes unchanged.

In some implementations, the second determining unit 1402 is further configured to determine, according to the occupancy bit information of the neighbouring nodes, a first number of nodes each occupied by a point among neighbouring nodes coplanar with the current node; and determine the prediction flag information of the current node according to the first number of nodes.

In some implementations, the second comparing unit 1404 is further configured to compare the first number of nodes with a second threshold; and determine the prediction flag information of the current node according to a comparison result between the first number of nodes and the second threshold.

Further, the second comparing unit 1404 is specifically configured to when the first number of nodes is less than the second threshold, determine that the prediction flag information of the current node is equal to a fifth value; and when the first number of nodes is greater than or equal to the second threshold, determine that the prediction flag information of the current node is equal to a sixth value.

In some implementations, the fifth value is 1 and the sixth value is 0; or the fifth value is 0 and the sixth value is 1.

In some implementations, the second determining unit 1402 is further configured to obtain an index value of the first context model according to the prediction flag information of the current node; and determine the first context model according to the index value of the first context model.

In some implementations, referring to FIG. 14, the decoder 140 may further include a second constructing unit 1406, which is configured to construct at least one first candidate context model each corresponding to a different index value.

Correspondingly, the second determining unit 1402 is specifically configured to select a first candidate context model corresponding to the index value among the at least one first candidate context model according to the index value of the first context model, and determine the selected first candidate context model as the first context model.

In some implementations, the second determining unit 1402 is further configured to determine, according to the occupancy bit information of the neighbouring nodes, a second number of nodes each occupied by a point among neighbouring nodes in a first plane corresponding to a coordinate value in a first direction equal to a seventh value, a third number of nodes each occupied by a point among neighbouring nodes in a second plane corresponding to a coordinate value in a second direction equal to the seventh value, and a fourth number of nodes each occupied by a point among neighbouring nodes in a third plane corresponding to a coordinate value in a third direction equal to the seventh value.

The second comparing unit 1404 is further configured to compare the second number of nodes with a third threshold and determine a first $1^{st}$ prediction value in a first coordinate direction according to a comparison result; compare the third number of nodes with the third threshold and determine a second $1^{st}$ prediction value in a second coordinate direction according to a comparison result; compare the fourth number of nodes with the third threshold and determine a third $1^{st}$ prediction value in a third coordinate direction according to a comparison result; and obtain a first set of prediction coordinate information of the current node according to the first $1^{st}$ prediction value, the second $1^{st}$ prediction value, and the third $1^{st}$ prediction value.

In some implementations, the second determining unit 1402 is further configured to determine, according to the occupancy bit information of the neighbouring node, a fifth number of nodes each occupied by a point among neighbouring nodes in a first plane corresponding to the coordinate value in the first direction equal to an eighth value, a sixth number of nodes each occupied by a point among neighbouring nodes in a second plane corresponding to the coordinate value in the second direction equal to the eighth value, and a seventh number of nodes occupied by a point among neighbouring nodes in a third plane corresponding to the coordinate value in the third direction equal to the eighth value.

The second comparing unit 1404 is further configured to compare the fifth number of nodes with a fourth threshold and determine a first $2^{nd}$ prediction value in the first coordinate direction according to a comparison result; compare the sixth number of nodes with the fourth threshold and determine a second $2^{nd}$ prediction value in the second coordinate direction according to a comparison result; compare the seventh number of nodes with the fourth threshold and determine a third $2^{nd}$ prediction value in the third coordinate direction according to a comparison result; and obtain a second set of prediction coordinate information of the current node according to the first $2^{nd}$ prediction value, the second $2^{nd}$ prediction value, and the third 2nd prediction value.

In some implementations, the seventh value is −1 and the eighth value is 1; or the seventh value is 1 and the eighth value is −1.

In some implementations, the second obtaining unit 1401 is further configured to obtain the first set of prediction coordinate information and the second set of prediction coordinate information of the current node; obtain an index value of the second context model according to the first set of prediction coordinate information and the second set of prediction coordinate information.

The second determining unit 1402 is further configured to determine the second context model according to the index value of the second context model.

In some implementations, the second constructing unit 1406 is further configured to construct at least one second candidate context model each corresponding to a different index value.

Correspondingly, the second determining unit 1402 is further configured to select a second candidate context model corresponding to the index value from the at least one second candidate context model according to the index value of the second context model, and determine the selected second candidate context model as the second context model.

In some implementations, the second obtaining unit 1401 is further configured to obtain the first $1^{st}$ prediction value and the first $2^{nd}$ prediction value in the first coordinate direction, the second $1^{st}$ prediction value and the second $2^{nd}$ prediction value in the second coordinate direction, and the third $1^{st}$ prediction value and the third $2^{nd}$ prediction value in the third coordinate direction according to the first set of prediction coordinate information and the second set of prediction coordinate information.

The second determining unit 1402 is further configured to determine an index value of the second context model in the first coordinate direction according to the first $1^{st}$ prediction value and the first $2^{nd}$ prediction value in the first coordinate direction; determine an index value of the second context model in the second coordinate direction according to the second $1^{st}$ prediction value and the second $2^{nd}$ prediction value in the second coordinate direction; and determine an index value of the second context model in the third coordinate direction according to the third $1^{st}$ prediction value and the third $2^{nd}$ prediction value in the second coordinate direction.

It will be understood that in this disclosure the "unit" may be part of the circuitry, part of the processor, part of the program or software, etc., and may be a module, or may be non-modular. Furthermore, the components in the implementations may be integrated in a single processing unit, or each unit may be physically separate, or two or more units may be integrated in a single unit. The above integrated units may be implemented either in the form of hardware or in the form of software function modules.

It is understood that if the integrated unit is implemented as a software function module and not sold or used as a stand-alone product, the integrated unit may be stored in a computer-readable storage medium. Based on such understanding, implementations of the present disclosure provide a computer storage medium, which is applied to the decoder 140 and stores a computer program, the computer program implementing the method described in any of the preceding implementations when executed by the second processor.

Figure 15:
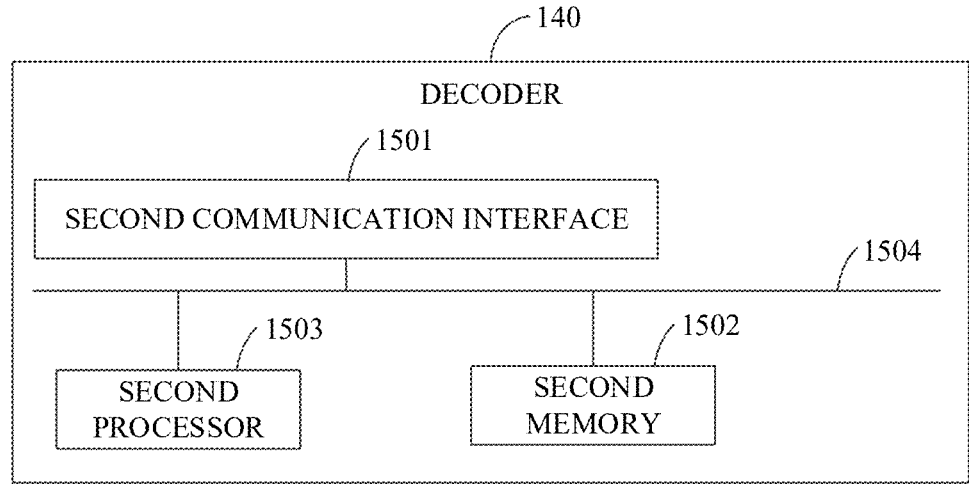
FIG. 15 is a schematic diagram of a specific hardware structure of a decoder provided in implementations of the present disclosure.

Based on the above structure of the decoder 140 and the computer storage medium, referring to FIG. 15, FIG. 15 illustrates a schematic diagram of the specific hardware structure of the decoder 140 provided in implementations of the present disclosure. As illustrated in FIG. 15, the decoder 140 may include a second communication interface 1501, a second memory 1502 and a second processor 1503. The components are coupled together via a second bus system 1504. It may be understood that the second bus system 1504 is configured to enable connection and communication between these components. The second bus system 1504 includes a power bus, a control bus and a status signal bus in addition to a data bus. For the sake of clarity, however, the various buses are labelled as second bus system 1504 in FIG. 15.

The second communication interface 1501 is configured to receive and transmit signals during information transmission with other external network elements.

The second memory 1502 is configured to store a computer program capable of running on the first processor 1503.

The second processor 1503 is configured to, when executing the computer program, obtain occupancy bit information of neighbouring nodes of a current node, determine a context model according to the occupancy bit information of the neighbouring nodes, and obtain related information of the current node by parsing a bitstream with the context model, where the related information includes at least one of flag information of a single child node or coordinate information of the single child node.

Optionally, as a further implementation, the second processor 1503 is further configured to perform the method described in any of the preceding implementations when running the computer program.

This disclosure provides the decoder which may include the second obtaining unit, the second determining unit and the decoding unit. Thus, in this way, since the occupancy bit information of neighbouring nodes is used to construct the context model, so that entropy decoding of flag information and coordinate information of the single child node is performed based on the constructed context model, the spatial correlation of the point cloud may be fully utilized, and thus the decoding efficiency of the point cloud may be improved.

It is to be noted that in the present disclosure the terms "including", "comprising" or any other variant thereof are intended to cover non-exclusive inclusion, such that a process, method, article or apparatus comprising a range of elements includes not only those elements, but also includes other elements that are not explicitly listed or are also inherent to such a process, method, article or device. Without further limitation, an element qualified by the statement "including a . . . " does not preclude the existence of another identical element in the process, method, article or apparatus including that element.

The above serial numbers of the implementations of the present disclosure are for descriptive purposes only and do not represent the merits of the implementations.

The methods disclosed in the several method implementations provided in this disclosure may be combined in any way to obtain new method implementations without conflict.

The features disclosed in the several product implementations provided in this disclosure may be combined in any way to obtain new product implementations without conflict.

The features disclosed in several method or apparatus implementations provided in this disclosure may be combined in any way to obtain new method implementations or apparatus implementations without conflict.

The foregoing is only a specific implementation of the present disclosure, but the scope of protection of the present disclosure is not limited thereto, and any variation or substitution readily conceivable by any person skilled in the art within the technical scope disclosed in the present disclosure shall be covered by the scope of protection of the present disclosure. Accordingly, the scope of protection of this disclosure shall be governed by the scope of protection of the stated claims.

INDUSTRIAL APPLICABILITY

In the disclosure, at the encoder side, the occupancy bit information of the neighbouring nodes of the current node is obtained. The context model is determined according to the occupancy bit information of the neighbouring nodes. The related information of the current node is entropy encoded with the context model and signalled into the bitstream, where the related information includes at least one of flag information of a single child node or coordinate information of the single child node. At the decoder side, the occupancy bit information of the neighbouring nodes of the current node is obtained. The context model is determined according to the occupancy bit information of the neighbouring nodes. The related information of the current node is obtained by parsing the bitstream with the context model, where the related information includes at least one of flag information of a single child node or coordinate information of the single child node. In this way, the context model is constructed using the occupancy bit information of the neighbouring nodes and then is used to entropy decode the flag information and coordinate information of the single child node, which can fully utilize the spatial correlation of the point cloud and thus the coding efficiency of the point cloud can be improved.

What is claimed is:

1. A point cloud decoding method, applied to a decoder and comprising:

obtaining occupancy bit information of neighbouring nodes of a current node;

determining a context model according to the occupancy bit information of the neighbouring nodes; and obtaining related information of the current node by parsing a bitstream with the context model, wherein the related information comprises at least one of flag information of a single child node or coordinate information of the single child node.

2. The method of claim 1, wherein determining the context model according to the occupancy bit information of the neighbouring nodes comprises:

determining prediction flag information of the current node according to the occupancy bit information of the neighbouring nodes; and determining a first context model according to the prediction flag information of the current node.

3. The method of claim 2, wherein obtaining the related information of the current node by parsing the bitstream with the context model comprises:

obtaining flag information of the single child node by parsing the bitstream with the first context model, wherein the flag information of the single child node indicates whether only one of child nodes partitioned from the current node is occupied.

4. The method of claim 3, further comprising:

when a value of the flag information of the single child node is equal to a first flag value, determining that only one of the child nodes partitioned from the current node is occupied; and when the value of the flag information of the single child node is equal to a second flag value, determining that at least two of the child nodes partitioned from the current node are occupied.

5. The method of claim 2, wherein determining the prediction flag information of the current node according to the occupancy bit information of the neighbouring nodes comprises:

determining, according to the occupancy bit information of the neighbouring nodes, a first number of nodes each occupied by a point among neighbouring nodes coplanar with the current node; and determining the prediction flag information of the current node according to the first number of nodes.

6. The method of claim 2, wherein determining the first context model according to the prediction flag information of the current node comprises:

obtaining an index value of the first context model according to the prediction flag information of the current node;

constructing at least one first candidate context model each corresponding to a different index value;

obtaining an index value of the first context model according to the prediction flag information of the current node; and selecting a first candidate context model corresponding to the index value among the at least one first candidate context model according to the index value of the first context model, and determining the selected first candidate context model as the first context model.

7. The method of claim 1, wherein determining the context model according to the occupancy bit information of the neighbouring nodes comprises:

determining prediction coordinate information of the current node according to the occupancy bit information of the neighbouring nodes; and determining a second context model according to the prediction coordinate information of the current node.

8. The method of claim 7, wherein obtaining the related information of the current node by parsing the bitstream with the context model comprises:

when the flag information of the single child node indicates that only one of child nodes partitioned from the current node is occupied, obtaining coordinate information of the single child node by parsing the bitstream with the second context model.

9. The method of claim 7, where obtaining the related information of the current node by parsing the bitstream with the context model comprises:

determining a neighbouring configuration number (NC) of the current node; and when the NC indicates that a neighbouring node of the current node is occupied, then when the flag information of the single child node indicates that only one of child nodes partitioned from the current node is occupied, obtaining the coordinate information of the single child node by parsing the bitstream with the second context model.

10. The method of claim 7, wherein determining the prediction coordinate information of the current node according to the occupancy bit information of the neighbouring nodes comprises:

determining, according to the occupancy bit information of the neighbouring nodes, a second number of nodes each occupied by a point among neighbouring nodes in a first plane corresponding to a seventh value in a first coordinate direction, a third number of nodes each occupied by a point among neighbouring nodes in a second plane corresponding to a seventh value in a second coordinate direction equal to the seventh value, and a fourth number of nodes each occupied by a point among neighbouring nodes in a third plane corresponding to a seventh value in a third coordinate direction equal to the seventh value;

comparing the second number of nodes with a third threshold and determining a first 1st prediction value in the first coordinate direction according to a comparison result;

comparing the third number of nodes with the third threshold and determining a second 1st prediction value in the second coordinate direction according to a comparison result;

comparing the fourth number of nodes with the third threshold and determining a third 1st prediction value in the third coordinate direction according to a comparison result; and obtaining a first set of prediction coordinate information of the current node according to the first 1st prediction value, the second 1st prediction value, and the third 1st prediction value.

11. The method of claim 1, wherein the neighbouring nodes comprise at least one of:

a neighbouring node coplanar with the current node, a neighbouring node collinear with the current node, or a neighbouring node concurrent with the current node.

12. The method of claim 11, where obtaining the occupancy bit information of the neighbouring nodes of the current node comprises:

when a neighbouring node is occupied by a point, determining that occupancy bit information of the neighbouring node is equal to a first value; and when the neighbouring node is not occupied by a point, determining that the occupancy bit information of the neighbouring node is equal to a second value.

13. The method of claim 1, further comprising:

determining a value of a single child node enabled variable; and correspondingly, determining the context model according to the occupancy bit information of the neighbouring nodes comprising:

determining the context model according to the occupancy bit information of the neighbouring nodes, when the value of the single child node enabled variable indicates that the current node is in a single child enabled state.

14. The method of claim 13, wherein determining the value of the single child node enabled variable comprises:

determining a number of nodes and a number of single child nodes;

performing a division operation on the number of single child nodes and the number of nodes to obtain a first ratio;

comparing the first ratio with a first threshold; and determining the value of the single child node enabled variable according to a comparison result between the first ratio and the first threshold.

15. The method of claim 14, further comprising:

parsing the bitstream; and for an i-th layer of an octree, setting an initial value of the number of nodes to be 0, setting an initial value of the number of single child nodes to be 0, and setting an initial value of the single child node enabled variable to be 0, i being an integer greater than or equal to 0 and less than K, K representing a number of layers of the octree and being an integer greater than 0.

16. The method of claim 15, wherein determining the number of nodes and the number of single child nodes comprises:

parsing the bitstream and obtaining the number of nodes based on decoded nodes in the i-th layer when determining that the current node is in the i-th layer of the octree; and obtaining the number of single child nodes by determining, from the decoded nodes, a decoded node with only one occupied child node.

17. The method of claim 16, wherein obtaining the number of single child nodes by determining, from the decoded nodes, the decoded node with only one occupied child node comprises:

for each of the decoded nodes, determining whether only one of child nodes partitioned from the current node is occupied;

based on a determination that only one of the child nodes partitioned from the decoded node is occupied, updating the number of single child nodes by incrementing the number of single child nodes by 1; and based on a determination that not only one of the child nodes partitioned from the decoded node is occupied, maintaining the number of single child nodes unchanged.

18. A point cloud encoding method, applied to an encoder and comprising:

obtaining occupancy bit information of neighbouring nodes of a current node;

determining a context model according to the occupancy bit information of the neighbouring nodes; and entropy encoding related information of the current node with the context model and signalling it into a bitstream, wherein the related information comprises at least one of flag information of a single child node or coordinate information of the single child node.

19. A decoder, comprising:

a processor; and a memory configured to store a computer program which, when executed by the processor, causes the processor to:

obtain occupancy bit information of neighbouring nodes of a current node;

determine a context model according to the occupancy bit information of the neighbouring nodes; and obtain related information of the current node by parsing a bitstream with the context model, wherein the related information comprises at least one of flag information of a single child node or coordinate information of the single child node.

20. An encoder, comprising:

a processor; and a memory configured to store a computer program which, when executed by the processor, causes the processor to perform the method of claim 18.

* * * * *